(12) United States Patent
Anderson et al.

(10) Patent No.: US 12,703,212 B2
(45) Date of Patent: Aug. 11, 2026

(54) HITCH APPARATUS AND SYSTEM

(71) Applicant: TeleSwivel, LLC, Durham, NC (US)

(72) Inventors: Carl Michael Anderson, Billings, MT (US); Corey Drew Rasmussen, Durham, NC (US); Mark Wesley Bevington, Yerington, NV (US); William David Woolf, Durham, NC (US); Ryan Matthew DelGizzi, Arvada, CO (US); Cody Paul Charland, Boulder, CO (US)

(73) Assignee: TeleSwivel, LLC, Durham, NC (US)

( * ) Notice: Subject to any disclaimer, the term of this patent is extended or adjusted under 35 U.S.C. 154(b) by 601 days.

(21) Appl. No.: 18/306,550

(22) Filed: Apr. 25, 2023

(65) Prior Publication Data

US 2023/0339271 A1 Oct. 26, 2023

Related U.S. Application Data

(60) Provisional application No. 63/335,067, filed on Apr. 26, 2022.

(51) Int. Cl.

| | |
|---|---|
| ***B60D 1/28*** | (2006.01) |
| ***B60D 1/167*** | (2006.01) |
| ***B60D 1/36*** | (2006.01) |
| *B60D 1/64* | (2006.01) |

(52) U.S. Cl.

CPC ............... *B60D 1/167* (2013.01); *B60D 1/28* (2013.01); *B60D 1/36* (2013.01); *B60D 1/64* (2013.01)

(58) Field of Classification Search

CPC . B60D 1/167; B60D 1/28; B60D 1/36; B60D 1/64; B60D 1/04; B60D 1/465; B60D 1/62

See application file for complete search history.

(56) References Cited

U.S. PATENT DOCUMENTS

| | | | | |
|---|---|---|---|---|
| 4,368,899 A | | 1/1983 | Smalley et al. | |
| 5,332,250 A | * | 7/1994 | Thorwall ................ | B60D 1/28 280/507 |
| 6,663,132 B1 | | 12/2003 | Kizy | |

(Continued)

OTHER PUBLICATIONS

"International Search Report and Written Opinion of the International Searching Authority", International Application No. PCT/US2023/019780, Nov. 21, 2023, 24 pp.

*Primary Examiner* — Valentin Neacsu
*Assistant Examiner* — Marlon A Arce
(74) *Attorney, Agent, or Firm* — Myers Bigel, P.A.

(57) ABSTRACT

A hitch system for connecting a towed vehicle to a towing vehicle includes a hitch apparatus attached to the towing vehicle and a control system operably associated with the hitch apparatus. The hitch apparatus includes a frame movably secured to the towing vehicle, and a hitch member secured to the frame that is configured to receive a coupling apparatus of the towed vehicle. The frame is movable relative to the towing vehicle such that the hitch member can be positioned rearward of the towing vehicle at any location within a defined three-dimensional space. The frame is configured to maintain the hitch member in a substantially level orientation at all locations within the three-dimensional space. The control system is configured to move the hitch member to a desired location within the three-dimensional space.

30 Claims, 24 Drawing Sheets

(56) References Cited

U.S. PATENT DOCUMENTS

| | | | | |
|---|---|---|---|---|
| 6,871,868 | B2 * | 3/2005 | Pogue | B60D 1/36 280/491.2 |
| 7,219,915 | B2 * | 5/2007 | Christensen | B60D 1/665 280/491.1 |
| 7,275,754 | B2 * | 10/2007 | Scharmuller | B60D 1/583 280/495 |
| 7,926,832 | B1 * | 4/2011 | Hall | B60D 1/065 280/441.2 |
| 8,678,421 | B1 * | 3/2014 | Williams, Jr. | B60D 1/155 280/479.1 |
| 8,798,842 | B2 | 8/2014 | Woolf et al. | |
| 8,905,424 | B2 | 12/2014 | Williams, Jr. et al. | |
| 9,340,078 | B2 * | 5/2016 | Benson | B60D 1/246 |
| 9,796,226 | B2 * | 10/2017 | Turner | B60D 1/246 |
| 10,106,002 | B2 * | 10/2018 | McAllister | B60D 1/06 |
| 10,639,950 | B2 * | 5/2020 | Borkholder | B60D 1/58 |
| 11,186,129 | B1 * | 11/2021 | McCurter | B60D 1/28 |
| 2002/0047248 | A1 | 4/2002 | Bernhardt et al. | |
| 2006/0163841 | A1 * | 7/2006 | Krstovic | B60D 1/40 280/478.1 |
| 2013/0277943 | A1 | 10/2013 | Wendte et al. | |
| 2014/0097595 | A1 | 4/2014 | Williams et al. | |
| 2018/0361929 | A1 | 12/2018 | Zhang et al. | |
| 2020/0353864 | A1 | 11/2020 | Niewiadomski et al. | |

* cited by examiner

HITCH APPARATUS AND SYSTEM

RELATED APPLICATION

This application claims the benefit of and priority to U.S. Provisional Patent Application No. 63/335,067 filed Apr. 26, 2022, the disclosure of which is incorporated herein by reference as if set forth in its entirety.

GOVERNMENT SUPPORT

This invention was made with Government support under Grant Contract Number W56HZV-22-C-0002 awarded by the U.S. Army Contracting Command-DTA. The United States Government has certain rights to this invention.

FIELD OF THE INVENTION

The present inventive concept relates generally to vehicle towing and, more particularly, to towing apparatus and systems.

BACKGROUND

Powered and trailed vehicles are conventionally interconnected for travel by coupling hitches involving fixed locations on the vehicles. Using conventional hitches (e.g., ball and socket-type, pintle and lunette-type, etc.), the required relative movement in six directions (translate and rotate in 3 directions) during travel may be provided. The fixed locations, however, may be difficult to effect, particularly with large vehicles that prevent ready manual alignment for final coupling. When accurate alignment is not obtained, conventionally the towing vehicle is repositioned, often multiple times, to accomplish exact hitch alignment, and/or the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased. The problem may be particularly troublesome for large steerable wheel trailers, such as those employed by the military. Moreover, the difficulty in connecting to military trailers can be made more difficult by rough terrain, inclement weather, and low visibility conditions.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the inventive concept.

Embodiments of the present inventive concept provide a hitch apparatus and system that can connect a commercial/standard trailer to a vehicle without manual input. The hitch system allows adaptation of the multitude of commercial and military trailers in existence today. The hitch system provides three-dimensional positioning of a towing vehicle hitch, and can accommodate a large envelope of lateral vertical and longitudinal misalignment when backing the towing vehicle to connect to a trailer or other towed vehicle. Actuating a mechanism can latch onto the trailer hitch, and then retract to secure the hitch to the vehicle chassis for transport.

According to some embodiments of the present inventive concept, a hitch apparatus for connecting a towed vehicle to a towing vehicle includes a frame movably secured to the towing vehicle, and a hitch member secured to the frame, the hitch member configured to receive a coupling apparatus of the towed vehicle. The hitch member may be, for example, a ball coupler, a pintle hook, a cushioned pintle hook, a swivel pintle hook, a lunette ring, or a clevis pin attachment. The frame is movable relative to the towing vehicle such that the hitch member can be positioned rearward of the towing vehicle at any location within a defined three-dimensional space. The frame is configured to maintain the hitch member in a substantially level orientation at all locations within the three-dimensional space. The frame is configured to rotate about a first axis (e.g., a vertical axis), rotate about a second axis (e.g., a horizontal axis) transverse to the first axis, and move between retracted and extended positions. A first actuator is configured to rotate the frame about the first axis, a second actuator is configured to rotate the frame about the second axis, and a third actuator is configured to move the frame between the retracted and extended positions. The first, second and third actuators may be hydraulic actuators, electrical actuators, or pneumatic actuators. A latching mechanism is configured to releasably secure the frame to the towing vehicle when the hitch apparatus is in a towing position.

According to some embodiments of the present inventive concept, a control system is operably associated with the hitch apparatus and is configured to move the hitch member to a desired location within the three-dimensional space. The control system may be a semi-autonomous (i.e., requiring some user interaction) and/or autonomous (i.e., requiring no user interaction) control system.

According to some embodiments of the present inventive concept, the control system is further configured to control a steering system, powertrain system, and brake system of the towing vehicle to position the towing vehicle adjacent to the towed vehicle. The control system is further configured to control the hitch apparatus to engage the hitch member with the coupling apparatus of the towed vehicle, and control the hitch apparatus to disengage the hitch member from the coupling apparatus of the towed vehicle. The control system may be a semi-autonomous and/or autonomous control system.

In some embodiments of the present inventive concept, the hitch system includes an imaging system, and the control system is configured to utilize image data from the imaging system to position the towing vehicle adjacent the towed vehicle and to engage the hitch member with the coupling apparatus of the towed vehicle. The imaging system includes at least one camera and may include a user interface that is configured to display image data from the imaging system.

In some embodiments of the present inventive concept, a manifold is configured to operably connect an electrical system and a pneumatic system of the towing vehicle to the towed vehicle. The manifold includes a first electrical connector connected to the electrical system of the towing vehicle and a first pneumatic connector connected to the pneumatic system of the towing vehicle. The manifold is configured to matingly engage a corresponding towed vehicle manifold that includes a second electrical connector connected to an electrical system of the towed vehicle and a second pneumatic connector connected to a pneumatic system of the towed vehicle. Engagement of the towing vehicle manifold and the towed vehicle manifold causes the first electrical connector to couple with the second electrical connector and the first pneumatic connector to couple with the second pneumatic connector. The control system may be configured to control engagement and disengagement of the towing vehicle manifold and towed vehicle manifold.

In some embodiments of the present inventive concept, a secondary retention apparatus is configured to automatically connect safety chains to the towing vehicle and automatically disconnect the safety chains from the towing vehicle. The control system may be further configured to control operation of the secondary retention apparatus to connect the safety chains to the towing vehicle and to disconnect the safety chains from the towing vehicle.

Embodiments of the present inventive concept include an autonomous hitch system that can make a dangerous, time-consuming and manpower intensive task an operation that can be done in a much shorter time period. In some embodiments of the present inventive concept, the hitch system can be used in a traditional mode with a towing vehicle driver and ground guide. The ground guide utilizes a controller to operate the hitch system without getting between the towing vehicle and the towed vehicle. In some embodiments of the present inventive concept, the hitch system can be used in a teleoperation mode. A driver or other person can operate the hitch system via a remote controller and screen without having to get out of the towing vehicle. In some embodiments of the present inventive concept, the hitch system can be used in an autonomous mode where human action is not required. The hitch system may be integrated with an autonomous vehicle control system, such as the Army's Autonomous Transport Vehicle-System program.

It is noted that aspects of the inventive concept described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present inventive concept are explained in detail below.

DETAILED DESCRIPTION

Figure 1:
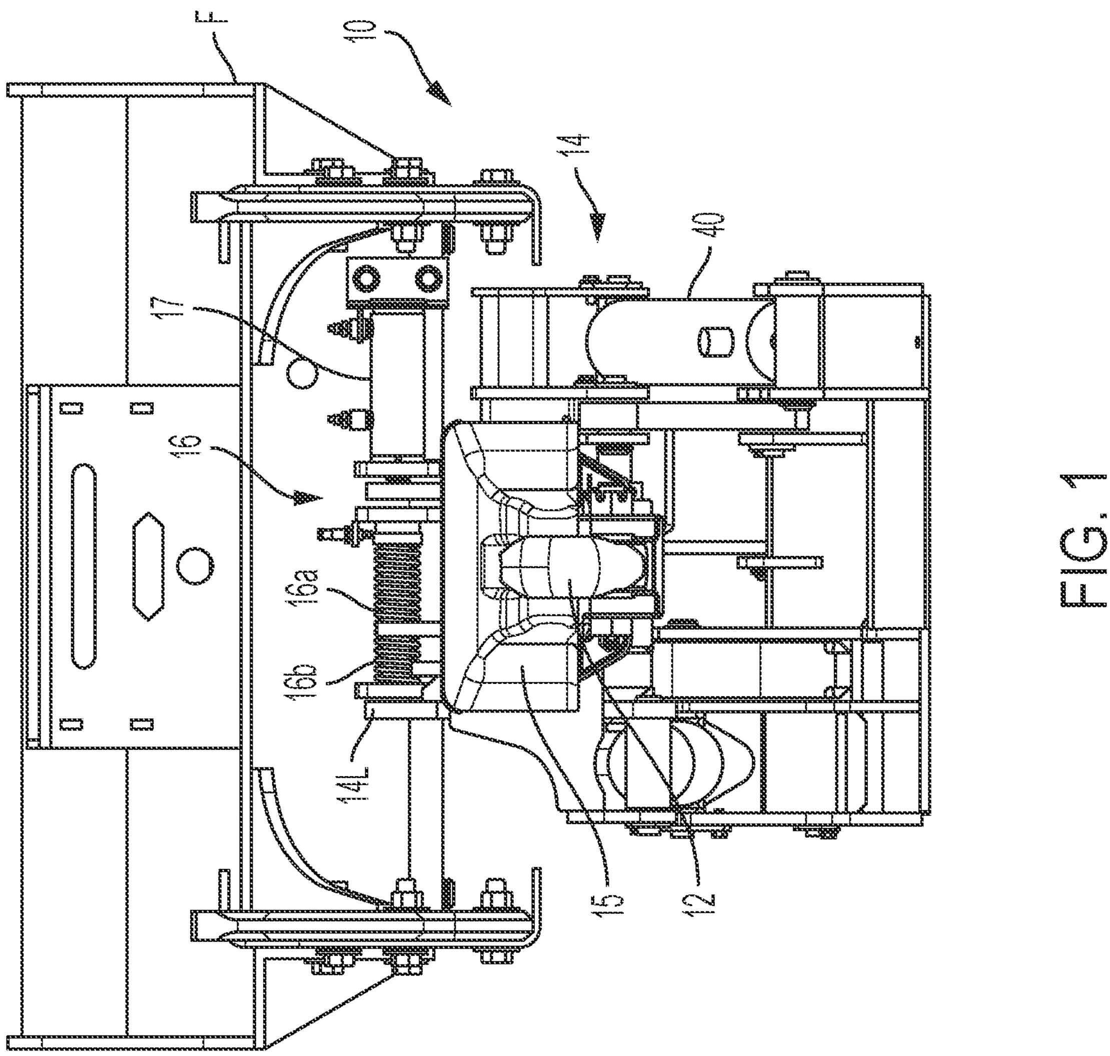
FIG. 1 is a front elevation view of a hitch apparatus mounted to a vehicle, according to some embodiments of the present inventive concept, and with some of the vehicle removed for clarity.

The present inventive concept will now be described more fully hereinafter with reference to the accompanying figures, in which embodiments of the inventive concept are shown. This inventive concept may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to the figures, a hitch apparatus 10 will be described. The hitch apparatus 10 is configured to be installed on a vehicle (e.g., a truck, a military vehicle, etc.) and, in some embodiments, is mounted to a frame F and/or underside of a vehicle (also referred to as a "vehicle chassis"), for example via bolts and/or welding. However, embodiments of the present inventive concept are not limited to being attached to a vehicle in any particular manner.

The hitch apparatus 10 includes a hitch member 12 secured to a movable frame 14. The hitch member 12 is configured to couple with a coupling apparatus (i.e., a hitch) of a towed vehicle, such as a trailer. In the illustrated embodiment, the hitch member 12 is a pintle hook that is configured to couple with a lunette ring LR (FIGS. 14A-14B) attached to a trailer tongue of a towed vehicle. The towed vehicle may be a trailer or any type of vehicle. However, embodiments of the present inventive concept may include other types of hitch members without limitation, such as a ball coupler, a spring cushioned pintle hook, a swivel pintle hook, a lunette ring, a clevis pin attachment, etc. In the illustrated embodiment, a bell-mouth casing 15 surrounds the pintle hitch 12. The bell-mouth housing 15 has a configuration that facilitates the alignment and mating of the pintle hitch 12 with a lunette ring LR of a towed vehicle. The pintle-lunette ring connection occurs when the lunette ring LR strikes the forward edge of the pintle hitch 12, activates the spring-loaded catch, and closes the pintle coupler jaw.

The hitch apparatus 10 also includes a latching mechanism 16 that releasably secures the movable frame 14 to the vehicle chassis F for towing operations. Releasing the latching mechanism 16 allows the frame 14 to move relative to the vehicle chassis F such that hitch member 12 can be moved to a position that allows the hitch member 12 to acquire a coupling apparatus, e.g., a lunette ring LR (FIGS. 14A-14B), of a towed vehicle. Once the hitch member 12 is attached to the coupling apparatus of a towed vehicle, the frame 14 is moved back to the tow position and the latching mechanism 16 secures the frame 14 to the vehicle chassis F.

The illustrated latching mechanism 16 includes a pin **16*a* that releasably engages an aperture 14*a* in a lug 14L of the frame 14 to secure the frame 14 in a tow position. The pin 16*a* is moved by an actuator 17 that is attached to the vehicle chassis F. The illustrated pin 16*a* is associated with a spring 16*b* that is configured to urge the pin 16 toward the locked position. Embodiments of the present inventive concept are not limited to the illustrated latching mechanism 16. Various ways of locking the hitch apparatus frame 14 in a tow position may be utilized without limitation. The latching mechanism 16 is configured to be controlled (e.g., electrically controlled, hydraulically controlled, pneumatically controlled, etc.). For example, in some embodiments, the latching mechanism 16 may be controlled via the same control system 600 (FIG. 12) that is utilized to control operation of the frame actuators 20, 40, 70** described below.

Figure 2:
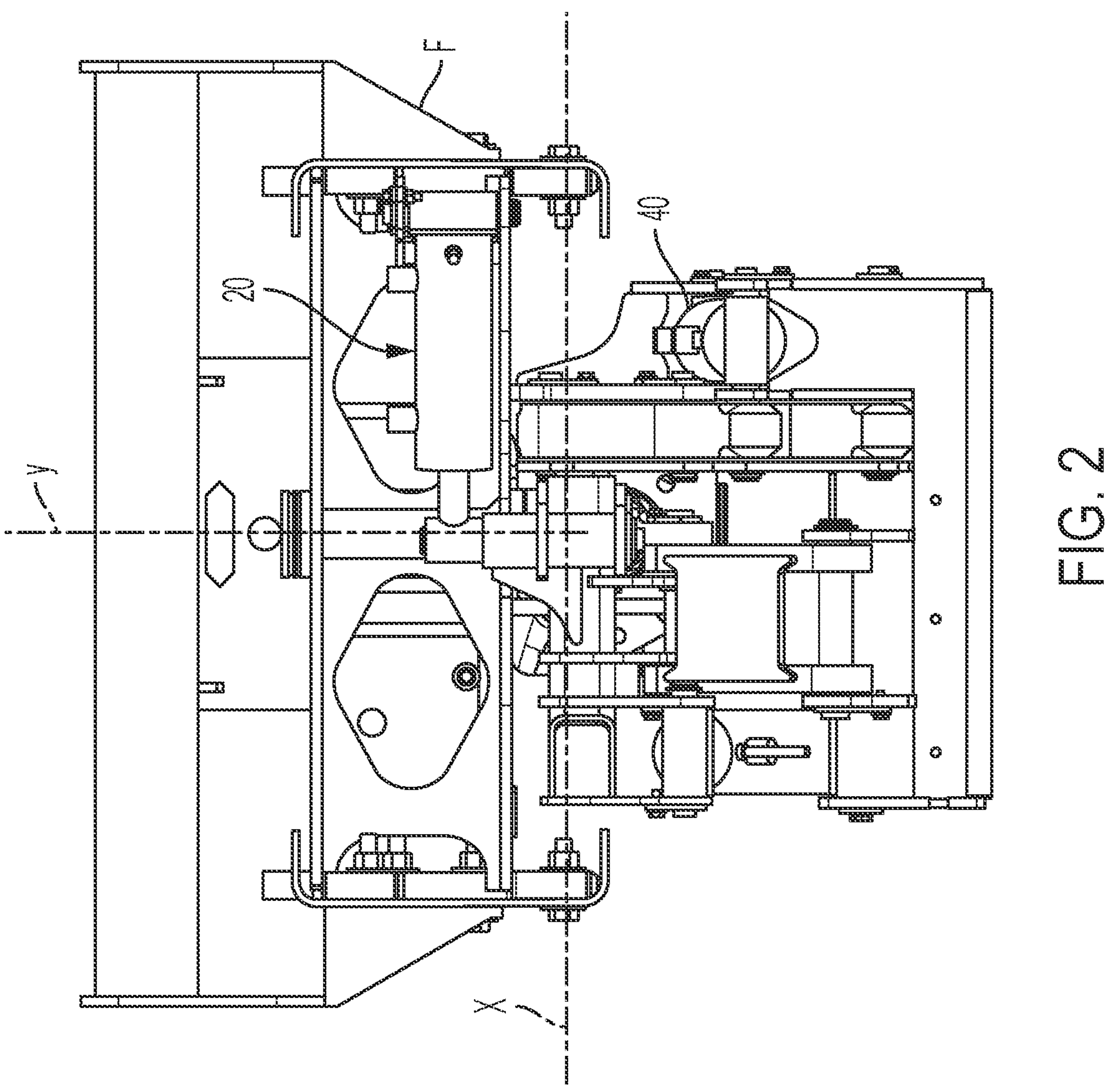
FIG. 2 is a rear elevation view of the hitch apparatus of FIG. 1.

The frame 14 is rotatably secured to the vehicle chassis F about a vertical axis Y, as illustrated in FIG. 2. An actuator 20, such as a hydraulic cylinder, is attached at one end to the vehicle chassis F and to the frame 14 at the other end. The actuator 20 rotates the frame 14 about the vertical axis Y for left and right positioning of the hitch apparatus 10.

Figure 3:
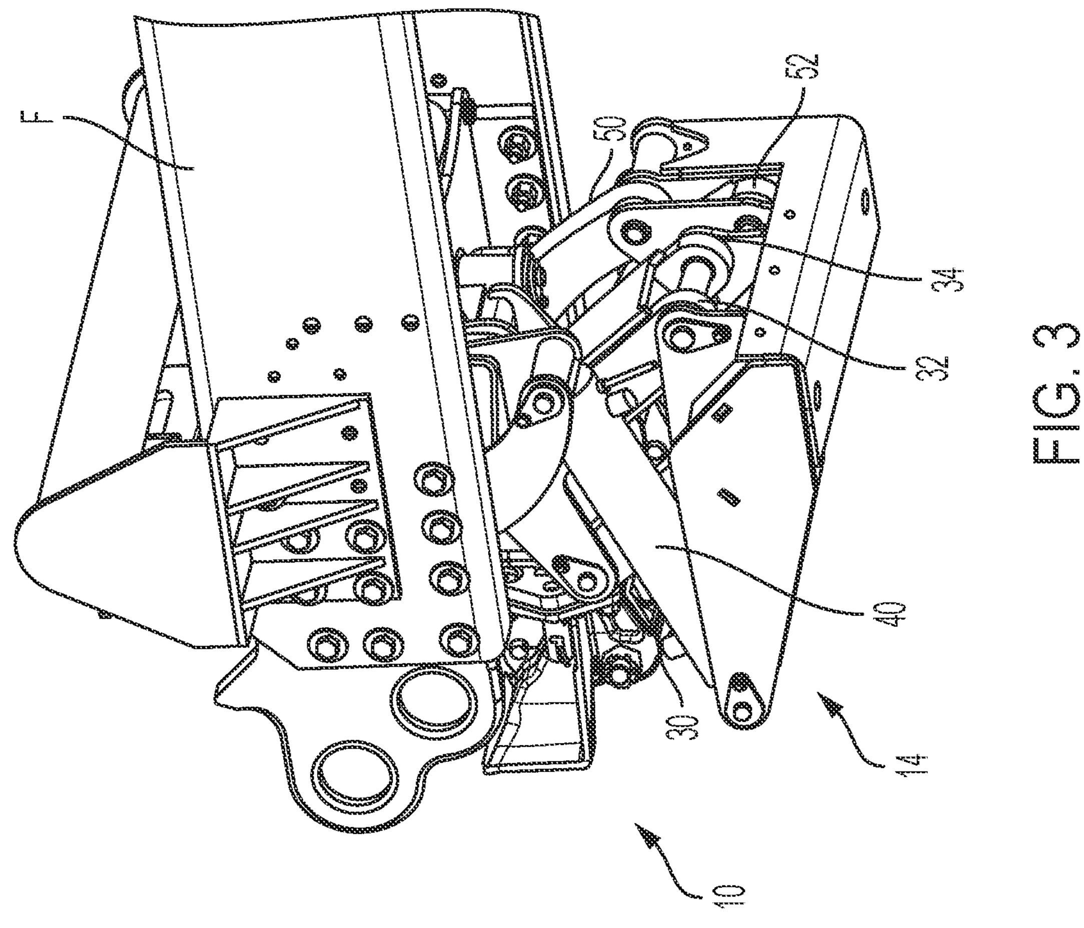
FIG. 3 is a right side perspective view of the hitch apparatus of FIG. 1.
Figure 4:
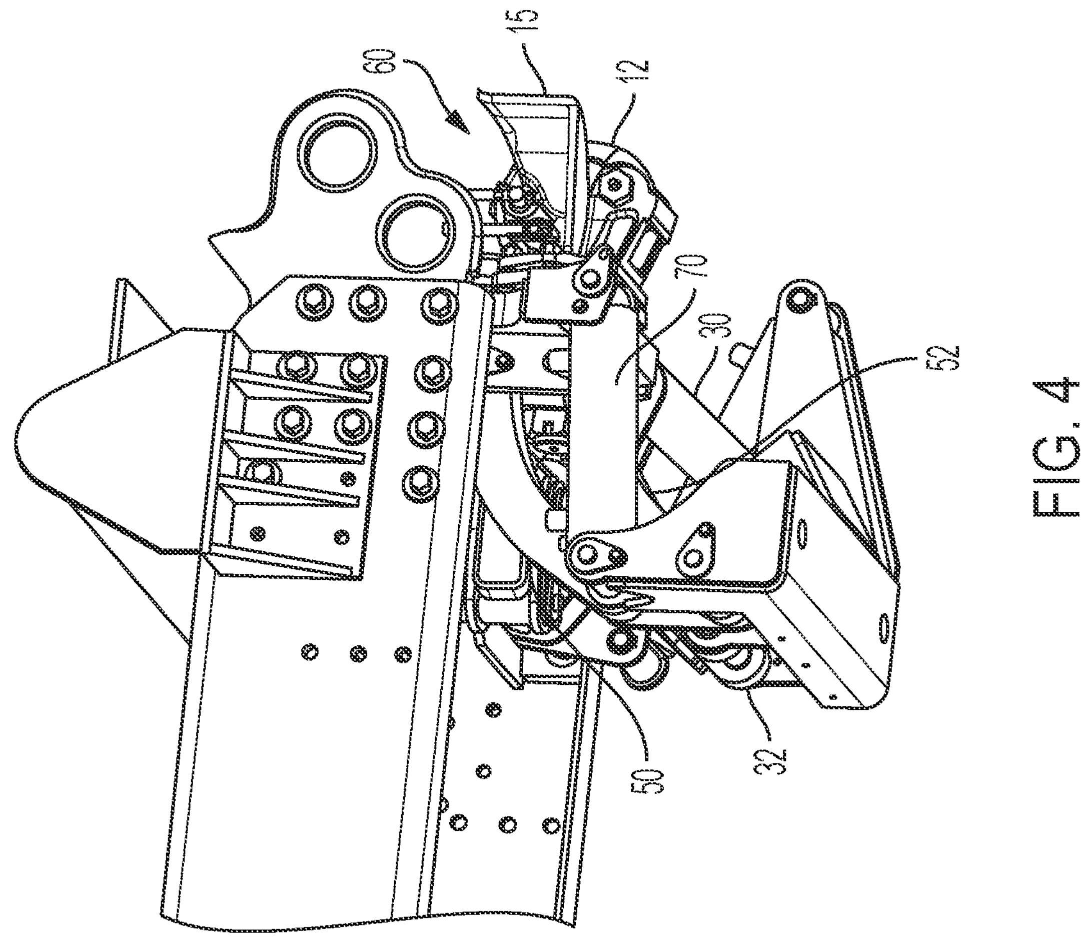
FIG. 4 is a left side perspective view of the hitch apparatus of FIG. 1.
Figure 5:
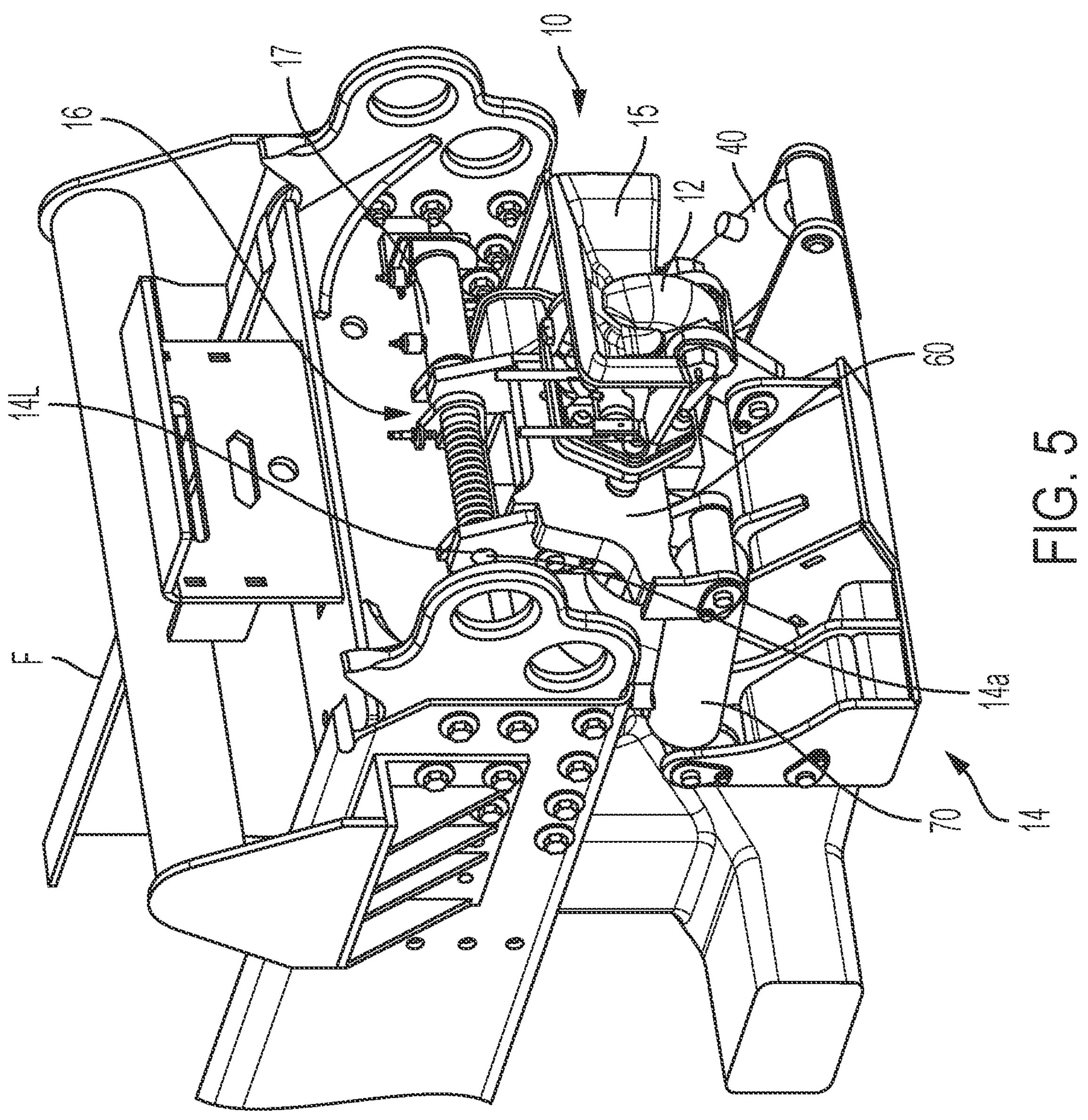
FIG. 5 is a rear perspective view of the hitch apparatus of FIG. 1 wherein the hitch apparatus is in a locked configuration for towing.

Articulating link members 30, 32, 34 (FIG. 3) allow the frame 14 to extend rearward from the vehicle. An actuator 40, such as a hydraulic cylinder, is provided to extend and retract the frame 14 relative to the towing vehicle. Articulating link members 50, 52 (FIG. 3) connect the frame 14 to a pintle frame 60 (FIG. 5) and allow the pintle frame 60 to extend, retract, raise and lower, relative to the frame 14. The hitch member 12 is secured to the pintle frame 60. In the illustrated embodiment, the hitch member 12 is a pintle hook. Another actuator 70 (FIG. 5) is attached to the frame 14 at one end and to the pintle frame 60 at the other end and is configured to raise and lower the pintle frame 60 and hitch member 12 relative to the vehicle.

The frame actuators 20, 40, 70 are configured to be controlled by a user or autonomously by one or more processors to position the hitch member 12 at a desired position within a three-dimensional coordinate system (i.e., three-dimensional movement within x-y-z space) and to attach to a coupling apparatus of a towed vehicle. The frame 14, the articulating link members 50, 52, and the pintle frame 60 are configured to maintain the hitch member 12 in a substantially level orientation at all locations within the three-dimensional space.

In the illustrated embodiment, the frame actuators 20, 40, 70 are hydraulic linear actuators having respective cylinder bodies and cylinder rods. Hydraulic fluid from a hydraulic system of the towing vehicle is utilized to extend and retract the cylinder rods relative to the cylinder bodies, as would understood by those of skill in the art of the present inventive concept. In some embodiments, a separate power unit may be utilized. In alternative embodiments, one or more of the frame actuators 20, 40, 70 may be other types of actuators, such as electric actuators, pneumatic actuators, mechanical actuators, link systems or other components known to those of ordinary skill in the art for coordinating movement of components relative to one another.

Figure 6:
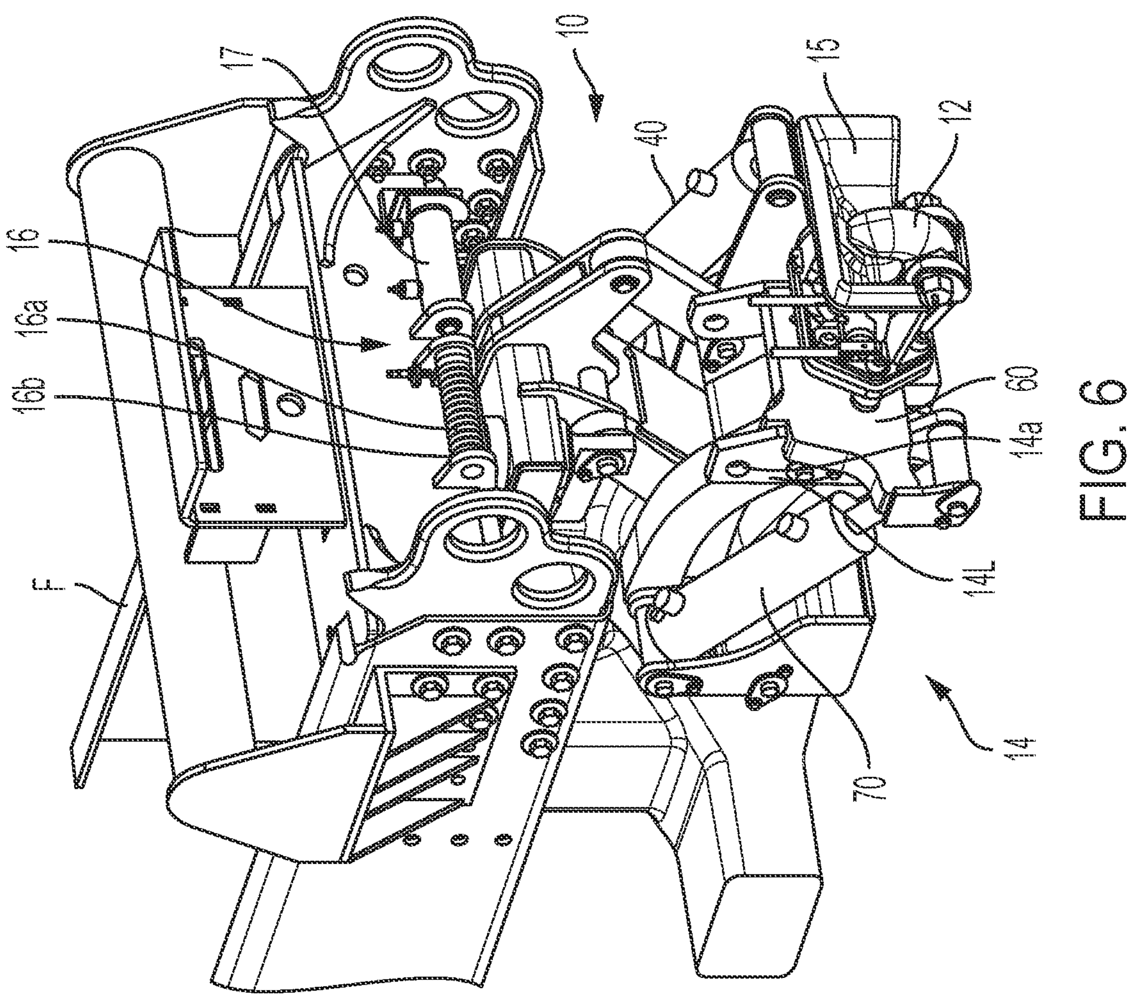
FIG. 6 illustrates the hitch apparatus of FIG. 5 in an unlocked and lowered configuration in preparation for coupling with a trailer or other towed vehicle.
Figure 7:
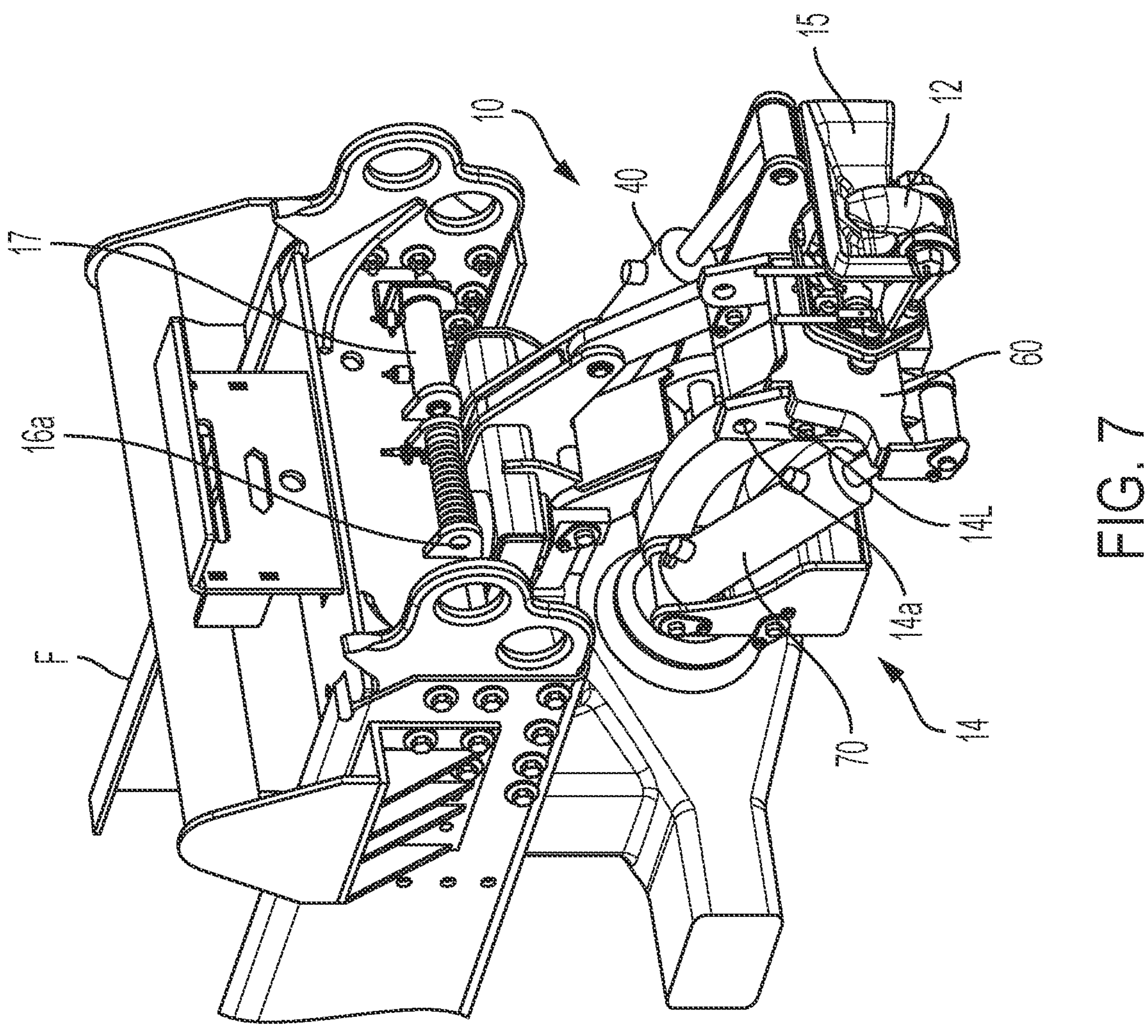
FIG. 7 illustrates the hitch apparatus of FIG. 6 with the pintle frame and coupler extended rearwardly from the vehicle.
Figure 8:
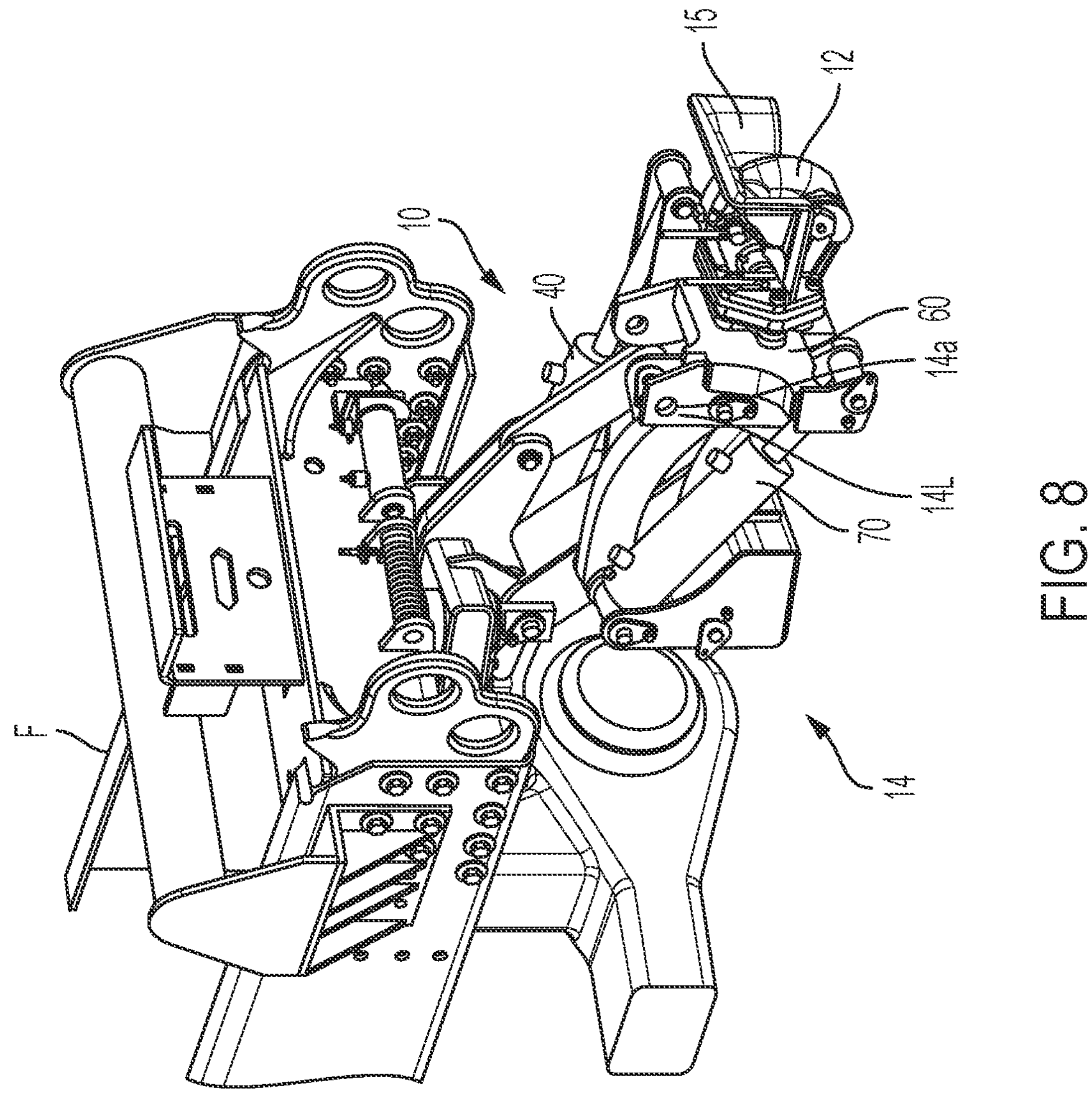
FIGS. 8 and 9 illustrate the hitch apparatus of FIG. 7 with the pintle frame and coupler extended outwardly and pivoted to the right.
Figure 9:
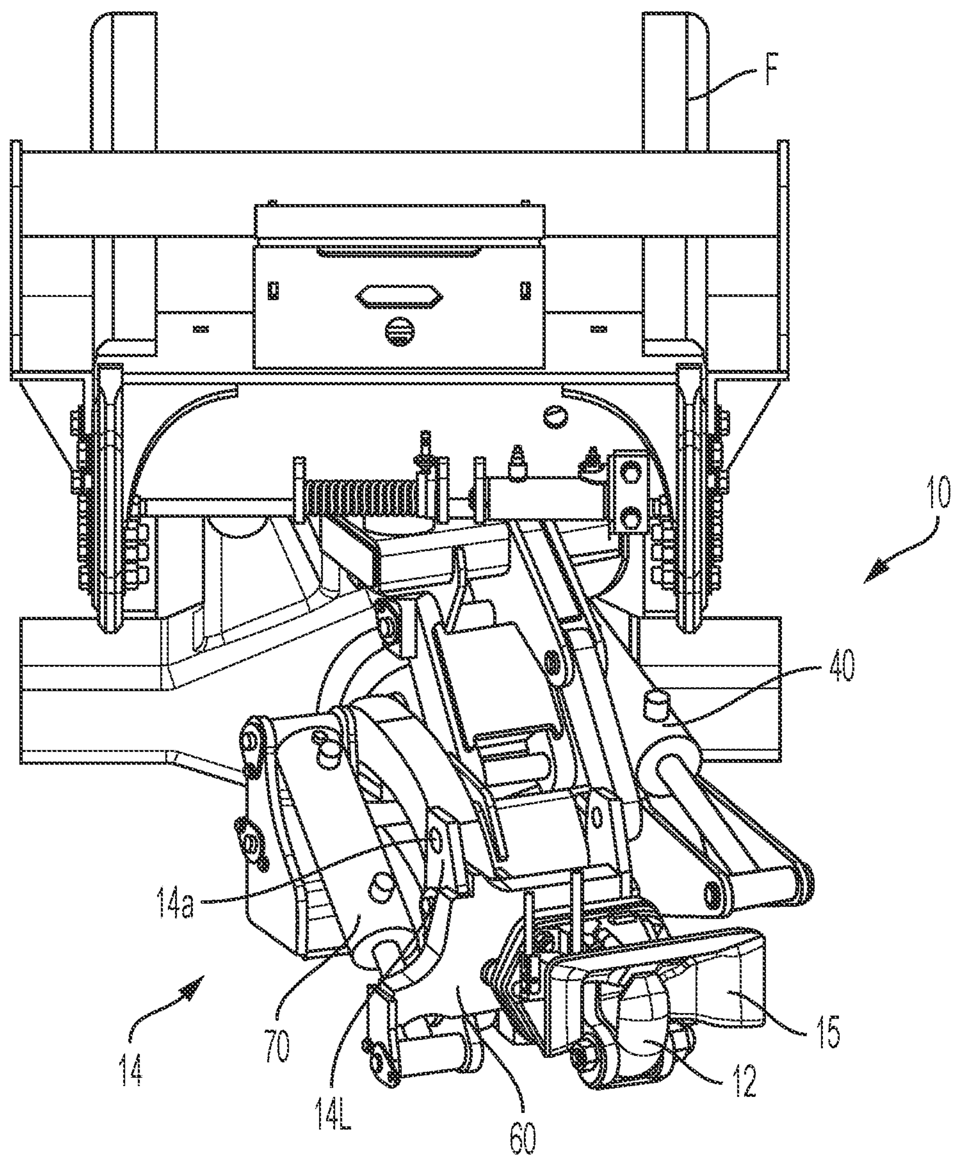

FIGS. 5-9 illustrate the hitch apparatus 10 in various positions. For example, in FIG. 5, the hitch apparatus 10 is in a locked configuration for towing. The locking pin **16*a* is engaged with an aperture 14*a* in lug 14L of the pintle frame 60. FIG. 6 illustrates the hitch apparatus 10 in an unlocked and lowered configuration. The locking pin 16*a* has been disengaged from the aperture 14*a* in lug 14L of the pintle frame 60. FIG. 7 illustrates the hitch apparatus 10 with the pintle frame 60 and hitch member 12 extended rearwardly from the vehicle. FIGS. 8 and 9 illustrate the hitch apparatus 10 with the pintle frame 60 and hitch member 12** pivoted to the right.

Figure 10:
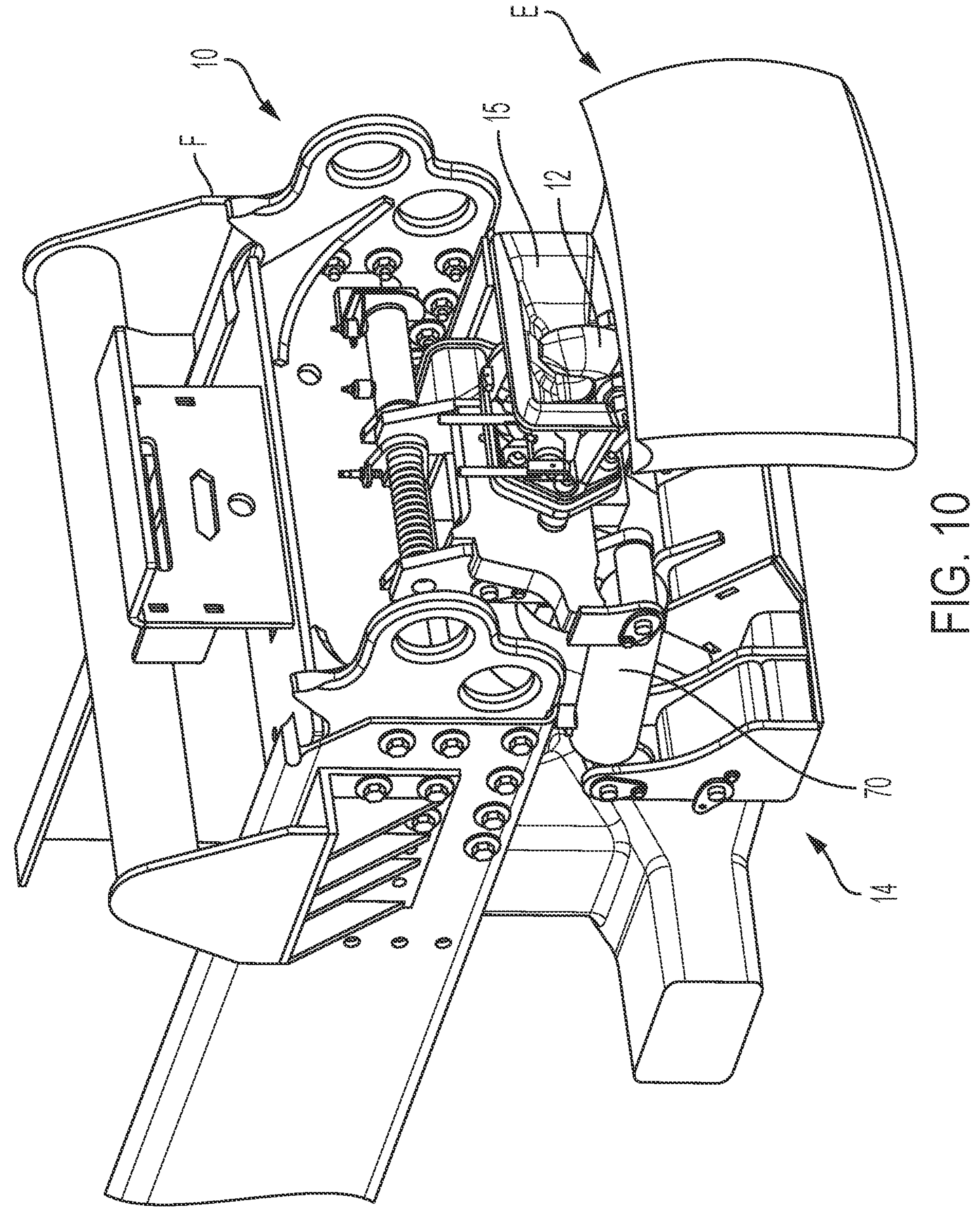
FIG. 10 illustrates the three dimensional space or "envelope" in which the coupler can be positioned via movement of the frame of the hitch apparatus.

Operating the actuators 20, 40, 70 separately or concurrently allows the hitch apparatus 10 to position the hitch member 12 within a large three dimensional space or "envelope" E (FIG. 10). The three-dimensional positioning capability of the hitch apparatus 10 gives a vehicle operator greater leeway in positioning the towing vehicle and eliminates the need for exact alignment of the towing vehicle and trailer or other towed vehicle or for placing a person in between the towing vehicle and a trailer or other towed vehicle to manually connect the two.

Figure 11A:
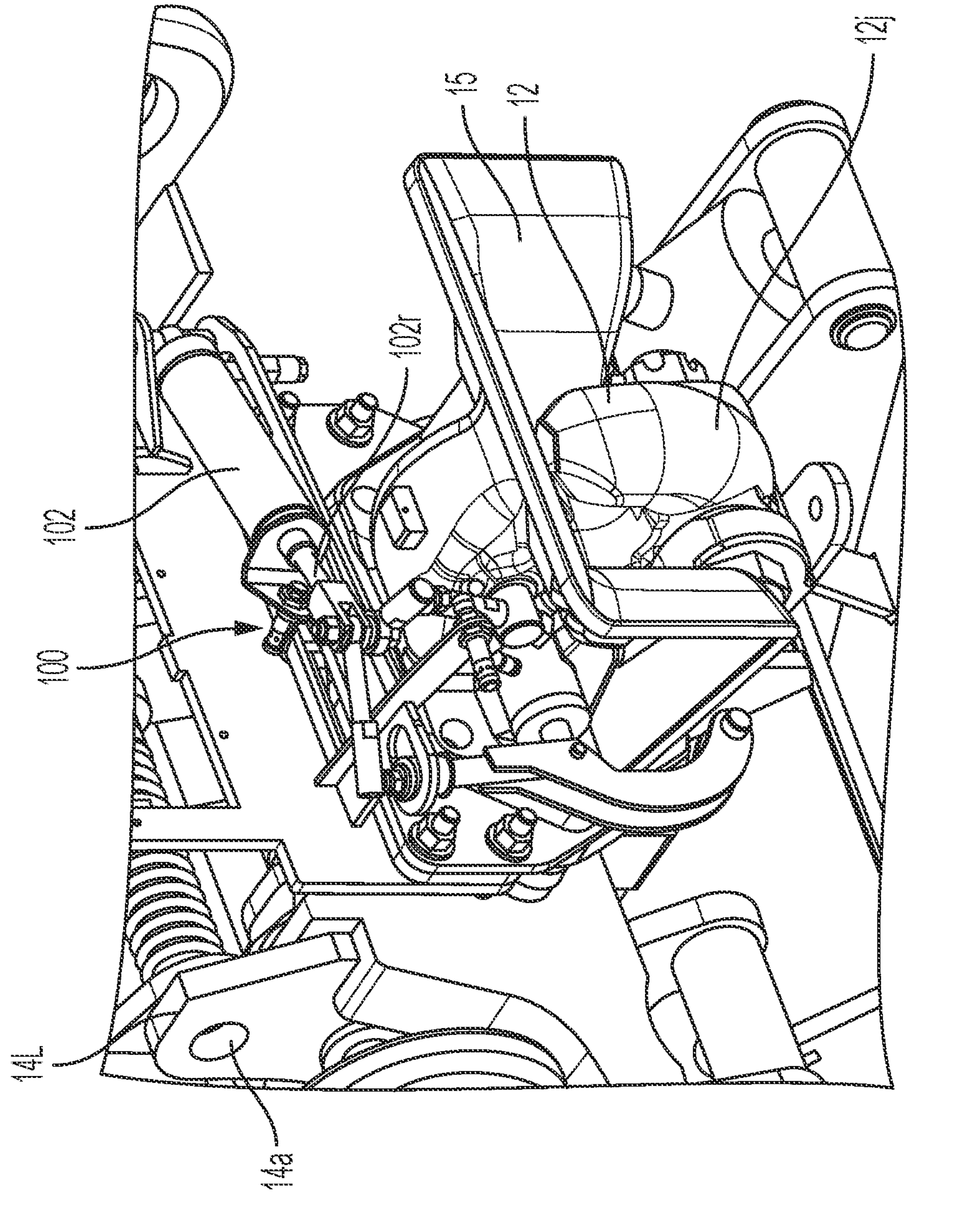
FIG. 11A is a perspective view of the hitch apparatus of FIG. 1 with the pintle hook in a locked position.
Figure 11B:
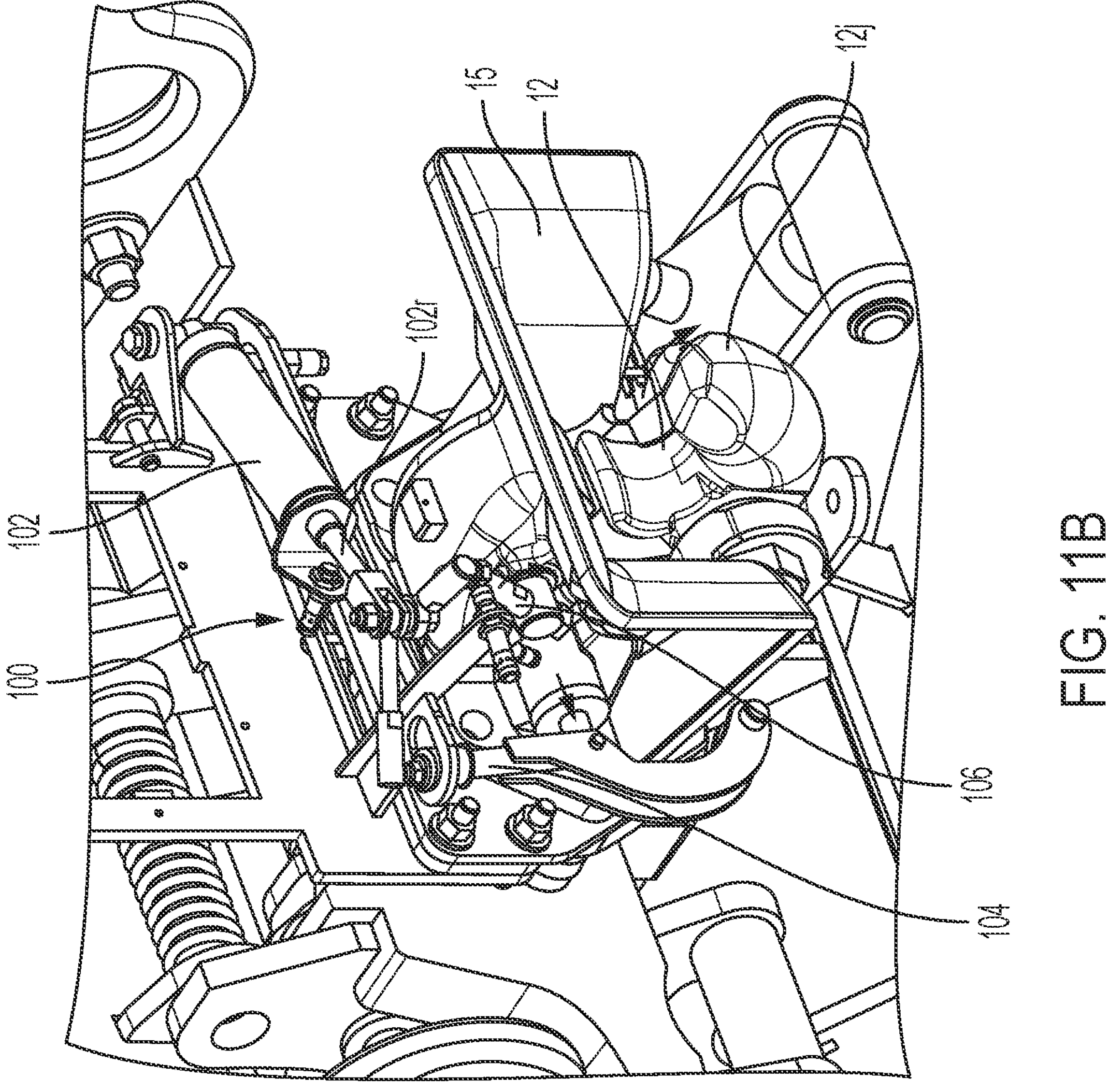
FIG. 11B is a perspective view of the hitch apparatus of FIG. 1 with the pintle hook in an unlocked position.

FIGS. 11A-11B illustrate the pintle release mechanism 100 of the hitch apparatus 10. The pintle release mechanism 100 uses a cylinder 102 to extend and first engage the pintle locking lever 104 pushing the lever 104 out and away from the pintle body to unlock the pintle hook 12. Once unlocked, the cylinder rod **102*r* pushes the pintle release lever 106 rearward (i.e., toward the towed vehicle) to open the pintle hook jaw 12*j*, which drops open automatically once both levers are engaged. The pintle hook jaw 12*j*** is held in the open position by a spring-loaded catch.

Figure 12:
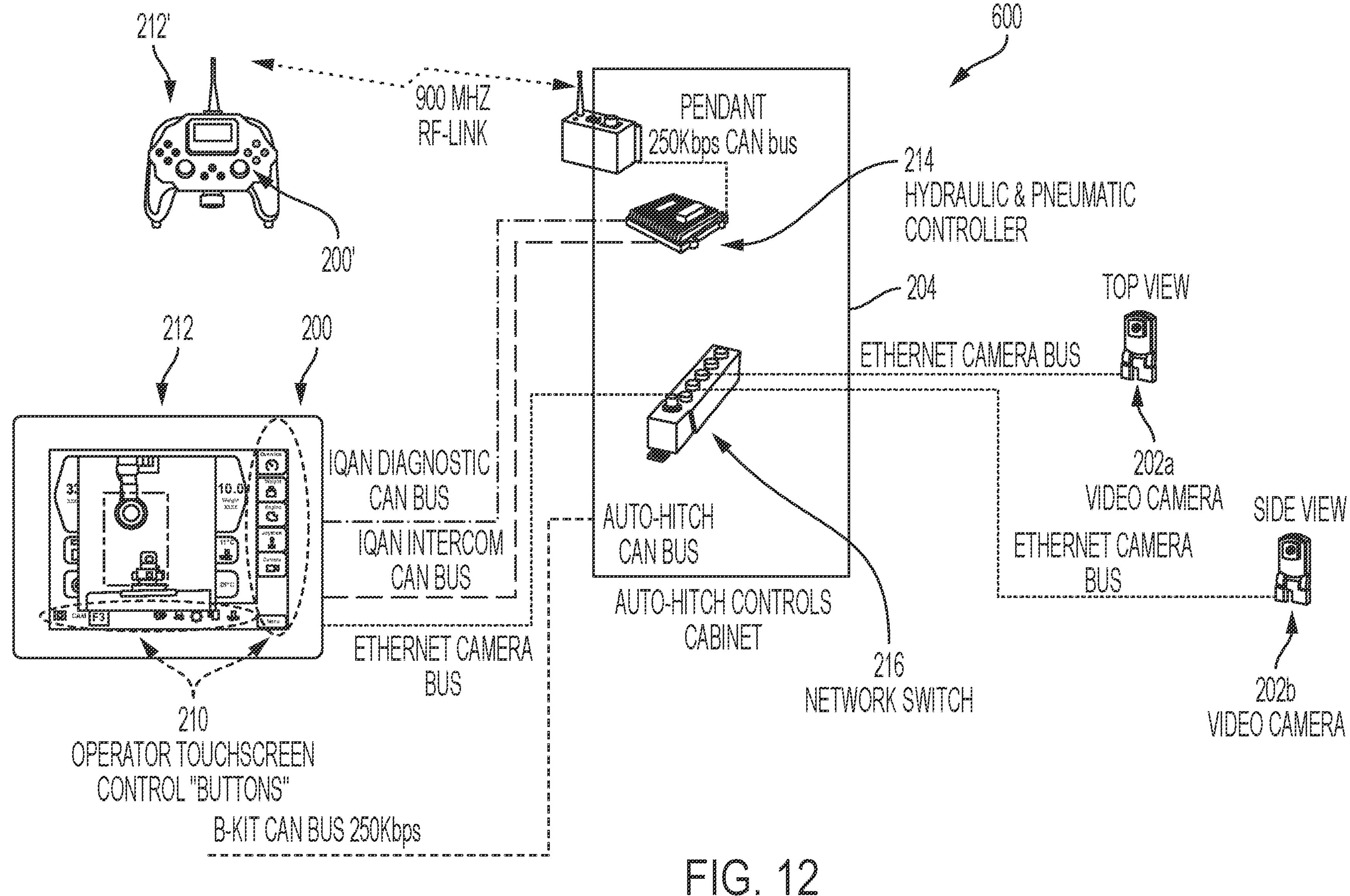
FIG. 12 is a schematic illustration of an example control system for a hitch apparatus, according to some embodiments.

FIG. 12 is a schematic illustration of an example control system 600 for the hitch apparatus 10. A user input device 200 may be located near the hitch apparatus 10 in some embodiments, for example, in the cab of a towing vehicle. In other embodiments, a user input device 200' and may be located remotely from the hitch apparatus 10 and the towing vehicle. The user input devices 200, 200' communicate with a pair of cameras **202*a*, 202*b* and the hitch apparatus actuators 20, 40, 70 via a controller area network (CAN) bus system 204 of the towing vehicle, as illustrated. A user can move and position the towing vehicle and can move the hitch apparatus 10 to connect with a coupling apparatus of a towed vehicle. The user input devices 200, 200' include respective control buttons 210, 210' and respective displays 212, 212'. The user input devices 200, 200' contain one or more processors configured to execute software for controlling the hitch apparatus 10 in response to inputs from a user. In addition, the user input devices 200, 200' may include one or more processors that contain computer vision software configured to utilize data from the cameras 202*a*, 202*b* to locate a towed vehicle and then connect the hitch apparatus 10** to the towed vehicle.

The hydraulic and pneumatic controller 214 works in conjunction with the user input devices 200, 200' and converts human operator inputs received via the user input devices 200, 200' into control commands for the hydraulic actuators 20, 40, 70 of the hitch apparatus 10. As such the operator is in direct control of the articulated hitch positioning of the pintle hook 12 in relation to the lunette ring LR based on what they can see on the display 212, 212'. This allows them to move the pintle hook 12 into position with respect to the lunette ring LR, and initiate the connect sequence, so that the hitch apparatus 10 can complete the connection of the towed vehicle to the towing vehicle.

The network switch 212 is used to combine the video stream from the cameras **202*a*, 202*b* into a single stream that can be supplied to the video input of the user input devices 200, 200'. The video streams coming from each camera 202*a*, 202*b* are uniquely identified via IP (Internet Protocol), UDP (User Datagram Protocol), or TCP/IP (Transmission Control Protocol/Internet Protocol) so that the single stream that is supplied to the display 212, 212' can be separated into individual streams internal to the display 212, 212'**. The user input device controls on the display allow an operator to change which camera stream is currently shown on the display between 3 modes; Top View camera only, Side View Camera only, or Both cameras at the same time.

In other embodiments, there is no user input device and operation of the hitch apparatus 10 is autonomously controlled by one or more processors associated with the towing vehicle and or another device/vehicle that execute various algorithms for locating a towed vehicle and to operate the hitch apparatus 10 to connect with the towed vehicle.

Figure 13A:
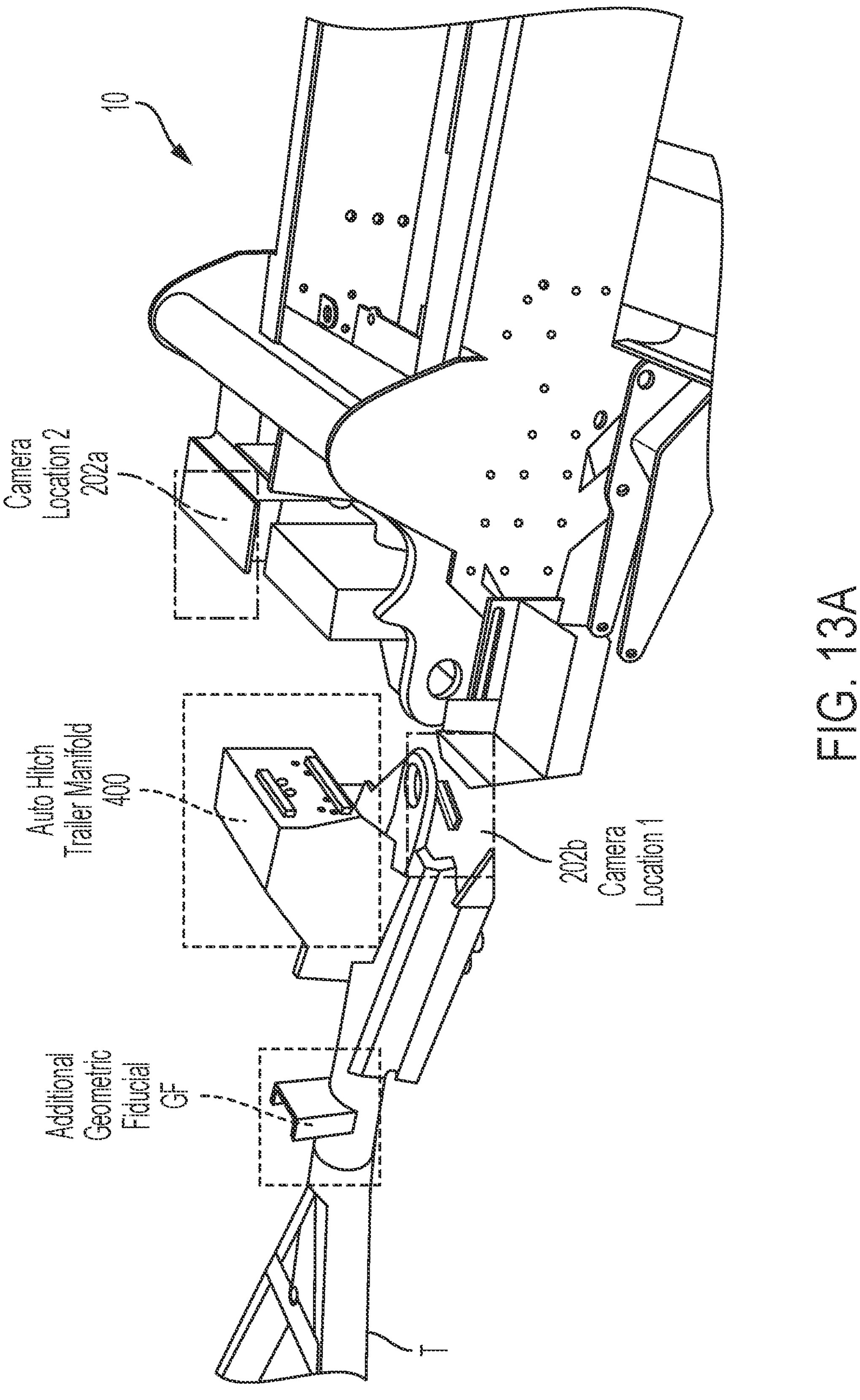
FIGS. 13A-13B illustrate example control system camera locations at the rear of a towing vehicle, according to some embodiments.

FIG. 13A is a partial illustration of the hitch apparatus 10 at the rear of a towing vehicle and a partial illustration of a trailer. Two example locations for cameras 202*a*, 202*b* on the towing vehicle are indicated. The positions of localization targets, shrouds, and a geometric fiducial GF on the trailer are also illustrated. The cameras 202*a*, 202*b* are "dumb" cameras and can only supply a stream of video based on where they are aimed.

Figure 13B:
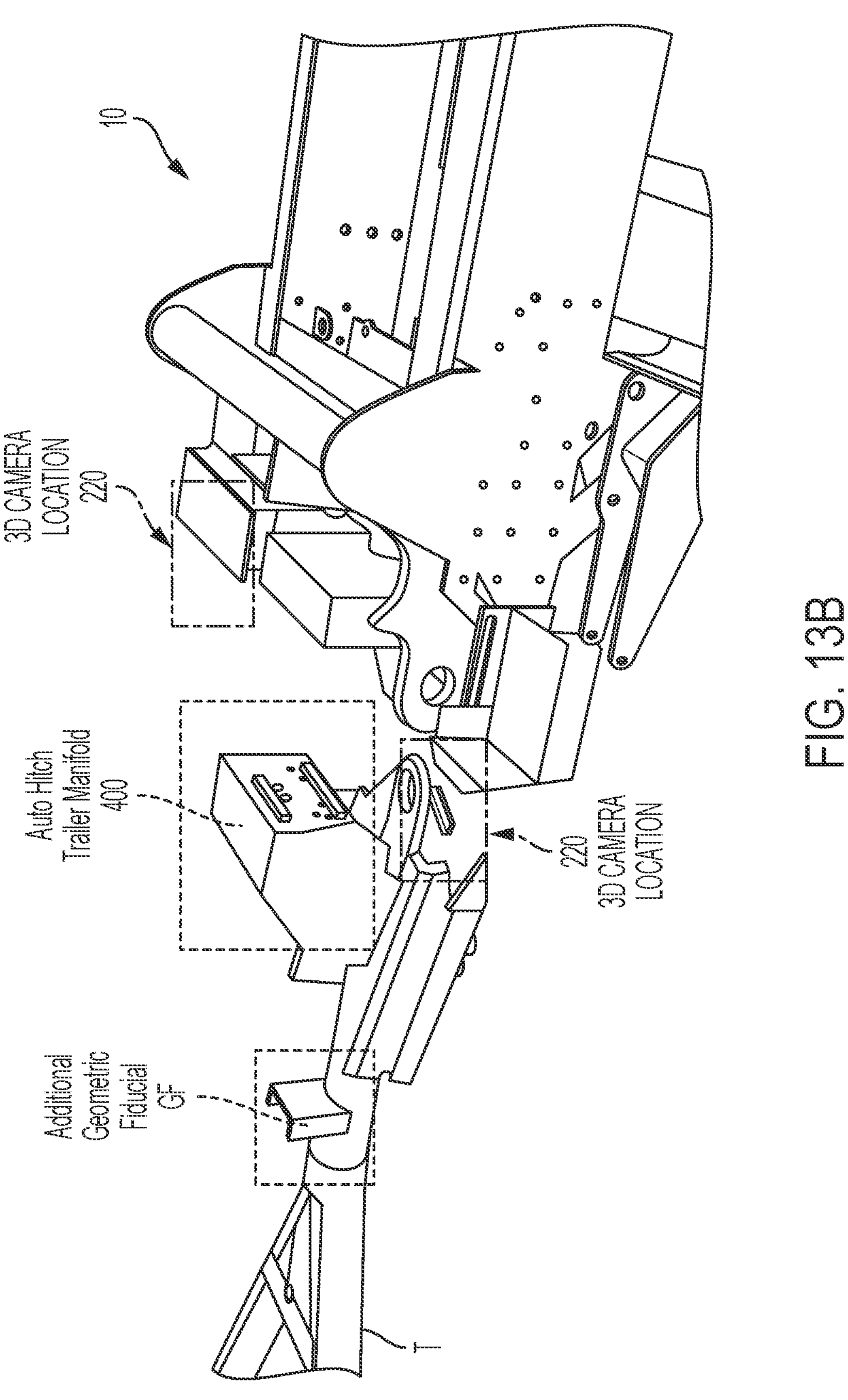

FIG. 13B is a partial illustration of the hitch apparatus 10 at the rear of a towing vehicle and a partial illustration of a trailer. Two example locations for a three-dimensional (3D) camera 220 for use in autonomous connection and disconnection operations are indicated. The positions of localization targets, shrouds, and a geometric fiducial GF on the trailer are also illustrated. The location of the 3D camera 220 is determined by the best "view" of the towed vehicle components that delivers optimal data (e.g., from the towed vehicle manifold 400 and or geometric fiducial GF) for the travel path planner module 710 (FIG. 19) to calculate the ideal path for the towing vehicle and hitch apparatus 10 to take in autonomous connection operations. The 3D camera 220 is a "smart" camera that not only supplies a stream of video, but also includes 3D information that can be used to create a point cloud of the various objects it is viewing. Exemplary 3D cameras that may be utilized are available from Framos GmbH, Taufkirchen, Germany. However, embodiments of the present inventive concept are not limited to any particular type of 3D camera. The 3D camera 220 replaces a human operator's eyes to acquire the visual control inputs, with an Autonomy Controller replacing the operator's manual control inputs, which combined make it possible to supply the information/data required by the hitch controller 214 (FIG. 12) needed to make/break a hitch connection autonomously.

Figure 15A:
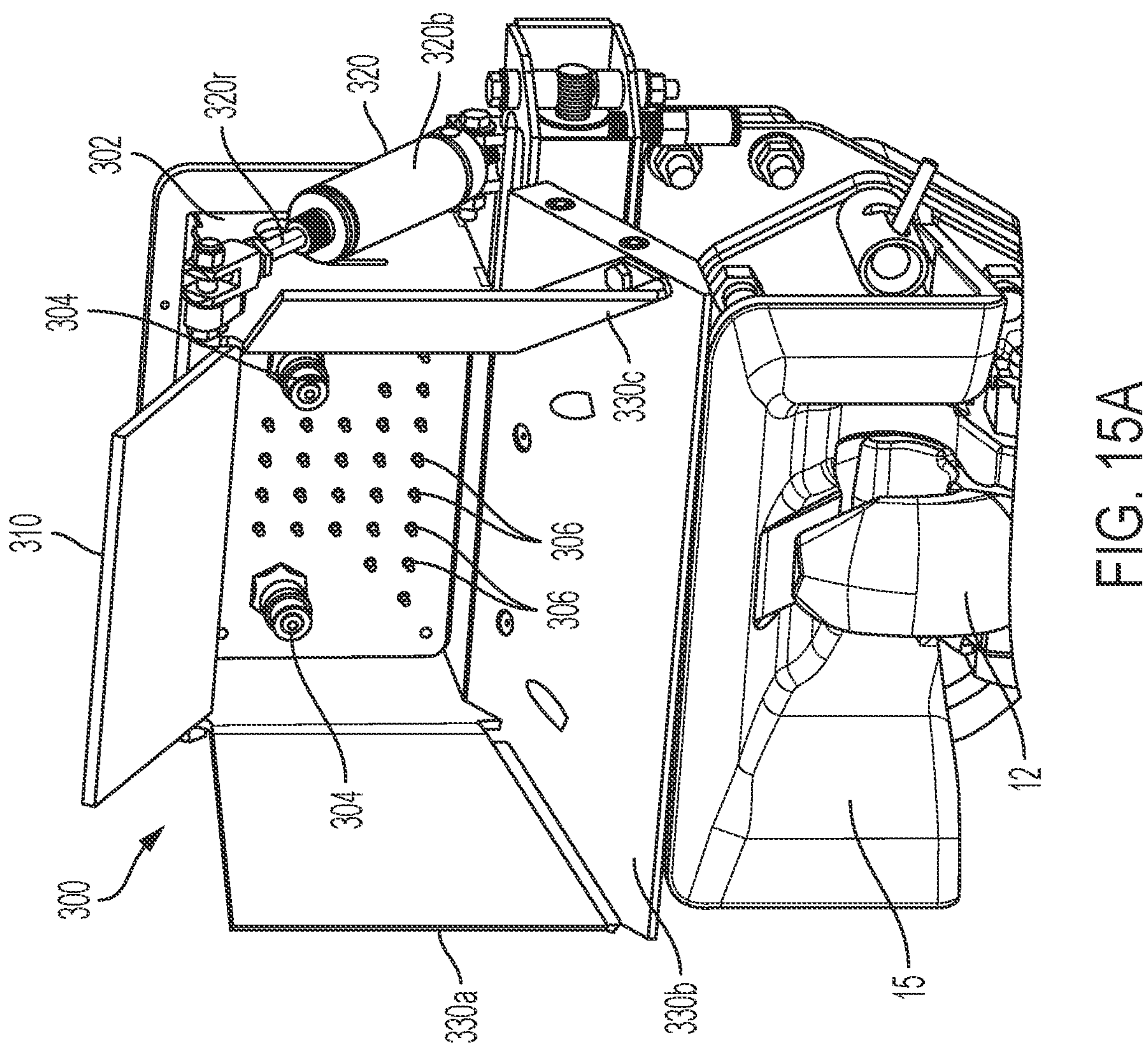
FIG. 15A is a partial front perspective view of the hitch apparatus according to the present inventive concept and with the air/power manifold cover in an open position.
Figure 15B:
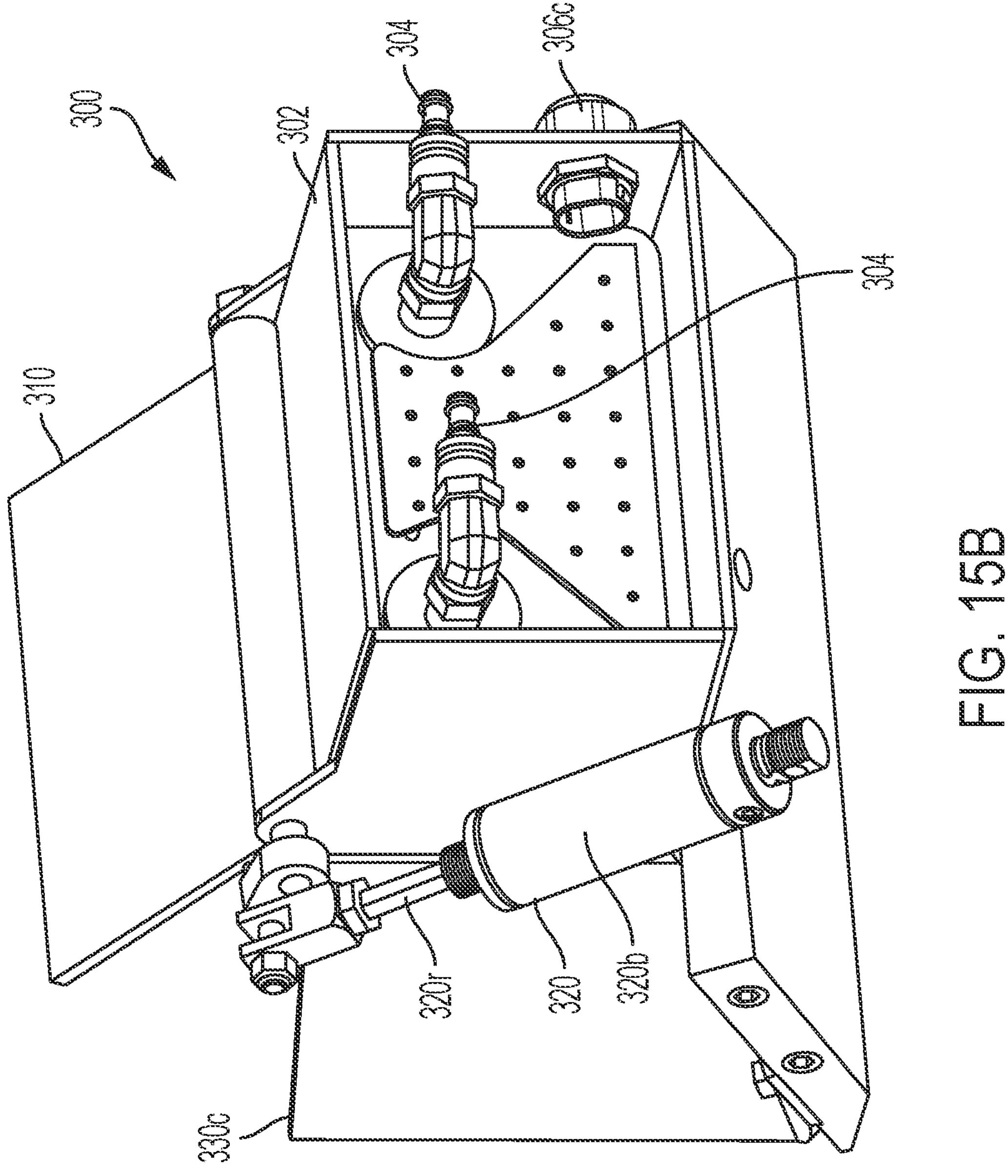
FIG. 15B is a rear perspective view of the air/power manifold of FIG. 15A with a portion of the housing thereof removed for clarity.

FIGS. 15A-15B illustrate an air/power manifold 300 of the towing vehicle that includes pneumatic fittings and electrical connectors that are configured for engagement with respective pneumatic fittings and electrical connectors of the towed vehicle. The illustrated air/power manifold 300 includes a housing 302 that contains the pneumatic fittings 304 and electrical connectors 306. The pneumatic fittings 304 extend through a rear portion of the housing 302 (FIG. 15B) and are configured to be connected to air lines of the towing vehicle. Similarly, the electrical connectors 306 are configured to be connected to wiring of the towing vehicle through an electrical conduit 306*c* in the housing 302 (FIG. 15B).

In the illustrated embodiment, there are two male pneumatic fittings 304 and twenty six spring pin-type electrical connectors 306. However, the air/power manifold 300 may have various numbers of pneumatic fittings 304, including a single pneumatic fitting. Similarly, the air/power manifold may have any number of electrical connectors 306. Moreover, various types of pneumatic fittings and electrical connectors may be utilized. Embodiments of the present inventive concept are not limited to any particular type of pneumatic fittings or electrical connectors The illustrated air/power manifold 300 includes a cover 310 that is pivotably secured to the housing 302 and is movable between closed and open positions via an actuator 320. The cover 310 is illustrated in the open position in FIGS. 15A-15B, and is illustrated in the closed position in FIG. 14A. In the illustrated embodiment, the actuator 320 is a pneumatic linear actuator having a cylinder body 320*b* and cylinder rod 320*r*. The distal end of the cylinder rod 320*r* is connected to the cover 310. Air from an air system of the towing vehicle is utilized to extend and retract the cylinder rod 320*r* relative to the cylinder body 320*b*, as would understood by those of skill in the art of the present invention. In alternative embodiments, the air/power manifold cover actuator 320 may be another type of actuator, such as an electric actuator, a hydraulic actuator, a mechanical actuator, or other components known to those of ordinary skill in the art.

Figure 17A:
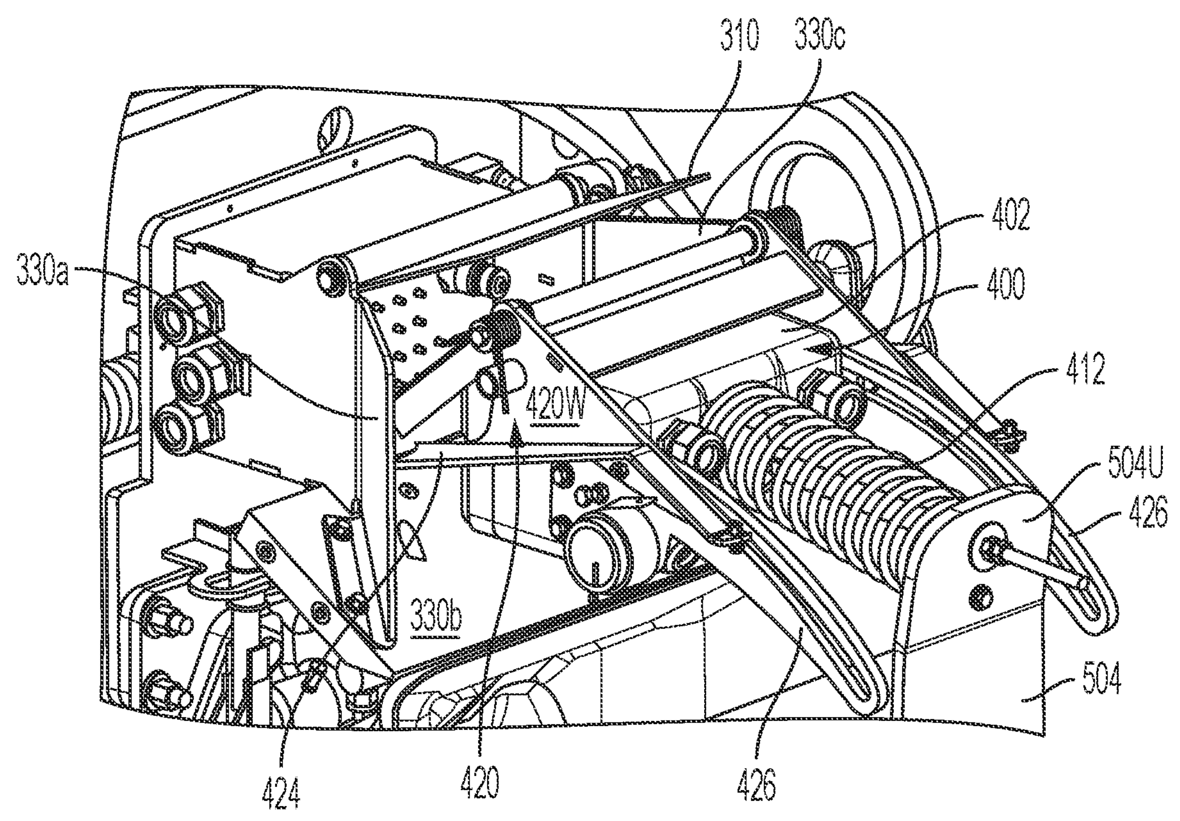
FIG. 17A is a partial perspective view of the towing vehicle air/power manifold being connected to the towed vehicle air/power manifold and illustrating the side wings of the protective apparatus of the towed vehicle air/power manifold making contact with the angled plates of the towing vehicle air/power manifold housing.
Figure 17B:
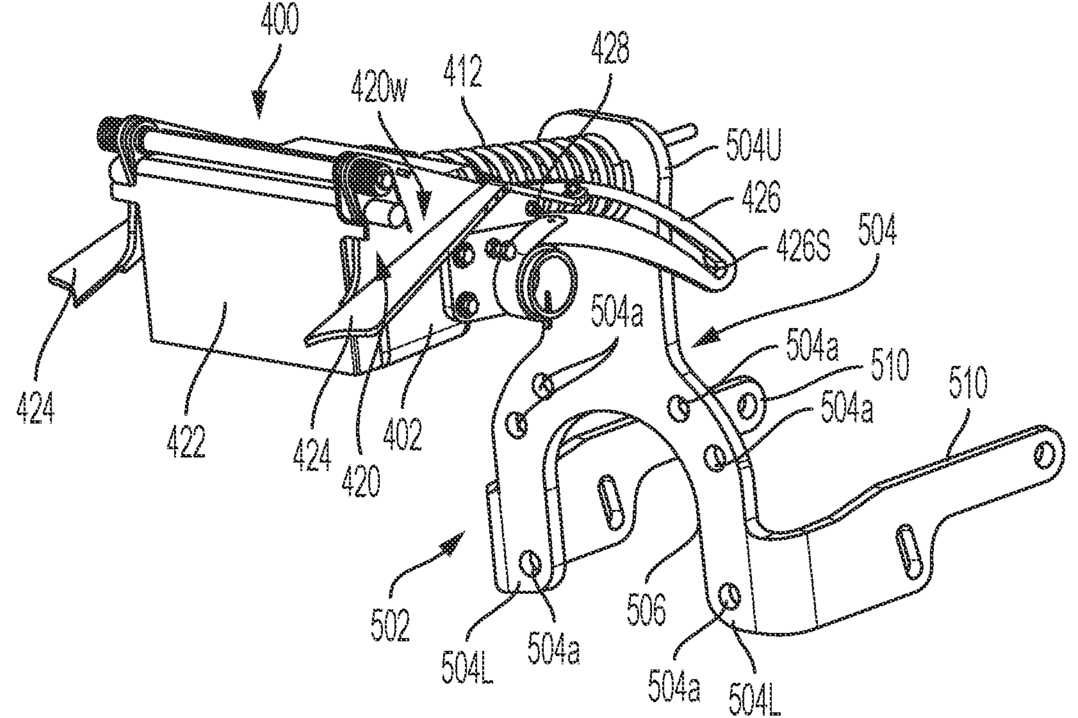
FIG. 17B is a partial perspective view of the towed vehicle air/power manifold assembly with the protective cover in a closed position.
Figure 17C:
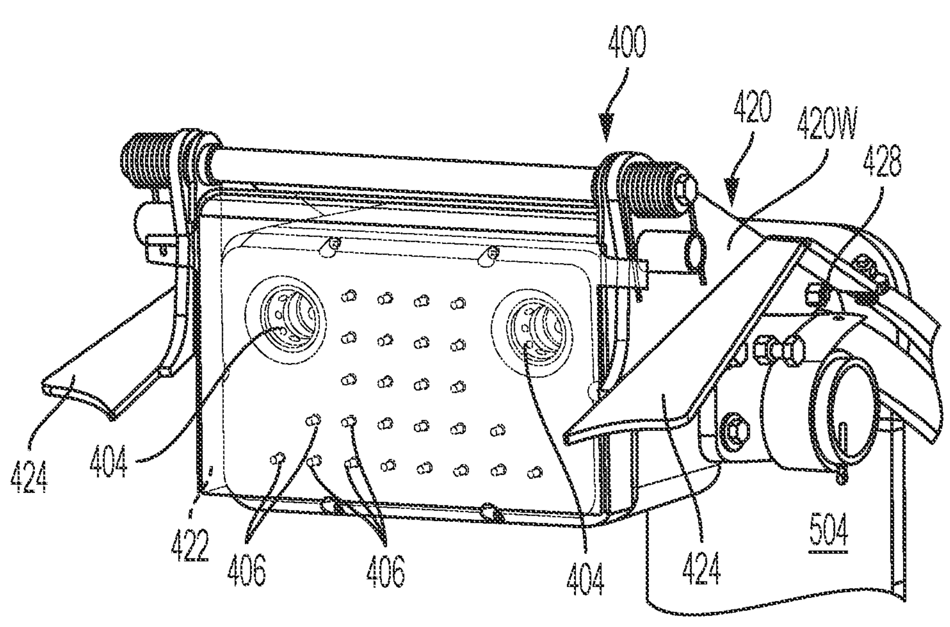
FIG. 17C is a partial perspective view of the towed vehicle air/power manifold assembly of FIG. 17B with the protective cover shown transparent to illustrate the pneumatic fitting and electrical connectors of the towed vehicle air/power manifold.

The illustrated air/power manifold housing 302 also includes guide plates 330*a*, 330*b*, 330*c* that are angled (i.e., diverge outwardly), as illustrated. These guide plates 330*a*, 330*b*, 330*c* facilitate proper insertion and connection of the towed vehicle air/power manifold 400 (FIGS. 14A-14B, 17A) with the towing vehicle air/power manifold 300.

FIGS. 14A-14B, 16A-16B, and 17A-17C illustrate a towed vehicle air/power manifold 400 that is configured to be connected to the towing vehicle air/power manifold 300. The illustrated towed vehicle air/power manifold 400 includes a housing 402 that contains pneumatic fittings 404 that are connected to a pneumatic system of the towed vehicle, and spring-type electrical connectors 406 (e.g., spring-type electrical connectors) that are connected to an electrical system of the towed vehicle. The illustrated towed vehicle air/power manifold 400 is sized and configured to mate with the towing vehicle air/power manifold 300 so that the electrical connectors 306 of the towing vehicle air/power manifold 300 couple with the electrical connectors 406 of the towed vehicle air/power manifold 400, and so that the pneumatic connectors 304 of the towing vehicle air/power manifold couple with the pneumatic connectors 404 of the towed vehicle air/power manifold 400.

In the illustrated embodiment, the pneumatic connectors 404 of the towed vehicle air/power manifold 400 are female connectors configured to matingly engage the male pneumatic connectors 304 of the towing vehicle air/power manifold 300. However, in other embodiments, this can be reversed wherein the pneumatic connectors 404 of the towed vehicle air/power manifold 400 are male connectors configured to matingly engage female pneumatic connectors 304 of the towing vehicle air/power manifold 300.

The illustrated towed vehicle air/power manifold 400 is supported by an upper portion 504*u* of the Y-shaped member 504 of the secondary retention assembly 502, described below, that is connected to the tongue T of the towed vehicle (e.g., a trailer tongue). A spring 412 is configured to urge the towed vehicle air/power manifold 400 outwardly which helps engagement of the towed vehicle air/power manifold 400 with the towing vehicle air/power manifold 300. In the illustrated embodiment, the towed vehicle air/power manifold 400 is operably associated with a protective apparatus 420 that includes a pivotable cover 422 that is movable between closed and open positions. The cover 422 overlies the pneumatic connectors 404 and electrical connectors 406 within the manifold 400 when not in use (i.e., not connected to a towing vehicle) and is configured to move to the open position to allow the towed vehicle air/power manifold to be connected to the towing vehicle air/power manifold 300.

The illustrated protective apparatus 420 includes a pair of sidewalls 420*w*, each sidewall 420*w* positioned in adjacent spaced apart relationship with a respective side of the towed vehicle air/power manifold 400. Each sidewall 420*w* includes a side wing 424 extending outwardly therefrom, as illustrated in FIGS. 14A-14B and 17A-17C. The side wings 424 are configured to engage the angled guide plates 330*a*, 330*c* of the towing vehicle air/power manifold 400 and help guide the two air/power manifolds 300, 400 into mating connection.

The towed vehicle air/power manifold 400 further includes a pair of elongate, arcuate brackets 426, each bracket 426 secured to a respective side of the air/power manifold housing 402. A threaded member 428 movably secures each sidewall 420*w* to a slot 426*s* of a respective bracket 426. This allows the protective apparatus 420 to be retracted rearward along the slots 426*c* relative to the towed vehicle air/power manifold 400 when the towed vehicle air/power manifold 400 is to be connected to the towing vehicle air/power manifold 300. Retraction of the protective apparatus 420 is caused by moving the hitch apparatus 10 toward the towed vehicle such that the side wings 424 engage the angled guide plates 330*a*, 330*c* of the towing vehicle air/power manifold housing 302. As the towing vehicle air/power manifold 300 moves closer to the towed vehicle air/power manifold 400 as a result of movement of the hitch apparatus 10, the engagement of the side wings 424 with the angled guide plates 330*a*, 330*c* of the towing vehicle air/power manifold 300 causes the protective apparatus 420 to retract rearwardly along the slot 426*s* in each bracket 426 away from the towed vehicle air/power manifold 400, as illustrated in FIG. 16B. This retraction of the protective apparatus 420 causes the air/power manifold cover 422 to open and retract, thereby exposing the pneumatic fittings 404 and electrical connectors 406 of the towed vehicle air/power manifold 400.

Figure 16A:
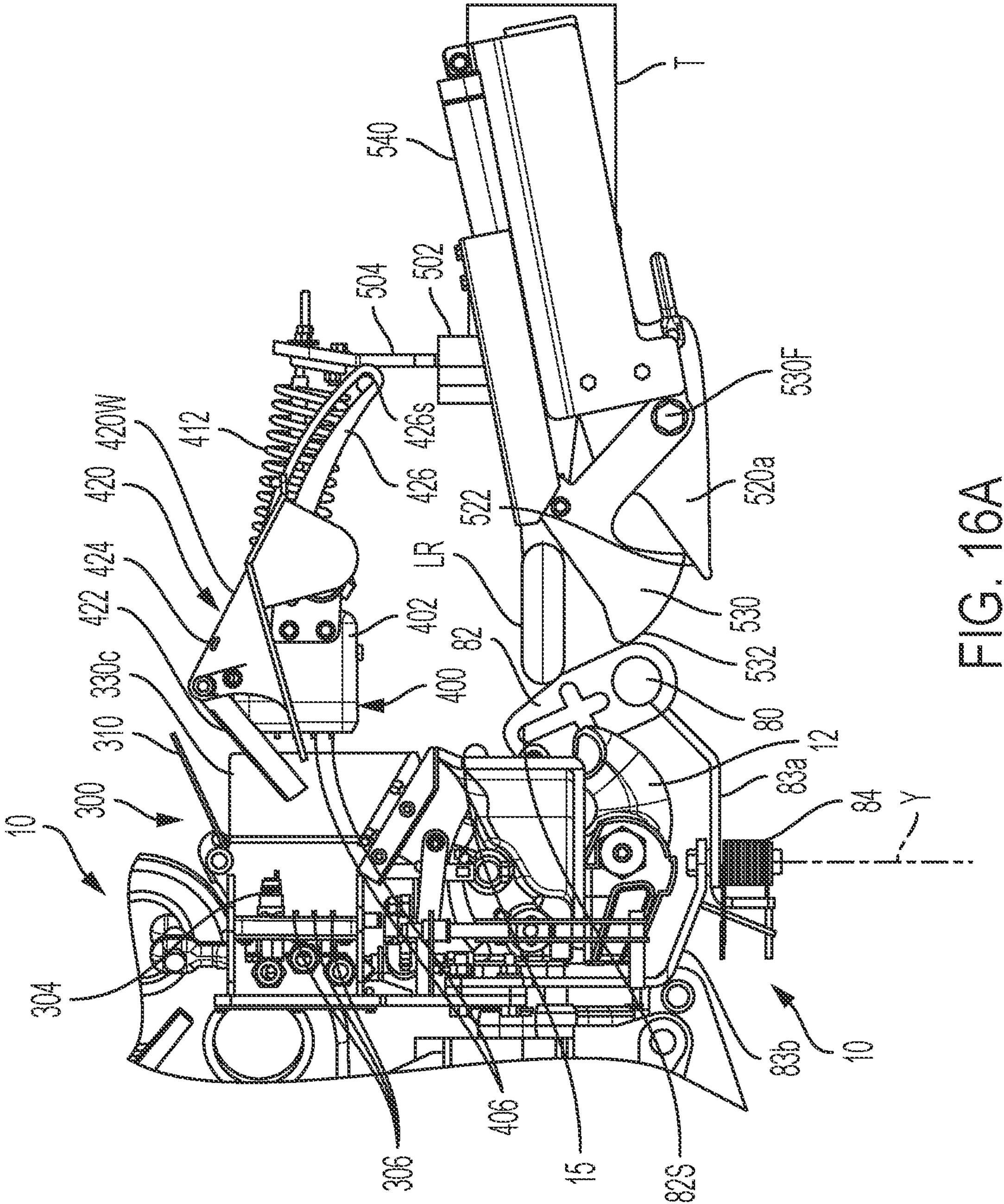
FIG. 16A is a side view of a hitch apparatus being positioned to connect to a lunette ring and air/power manifold of a towed vehicle, according to some embodiments of the present inventive concept.
Figure 16B:
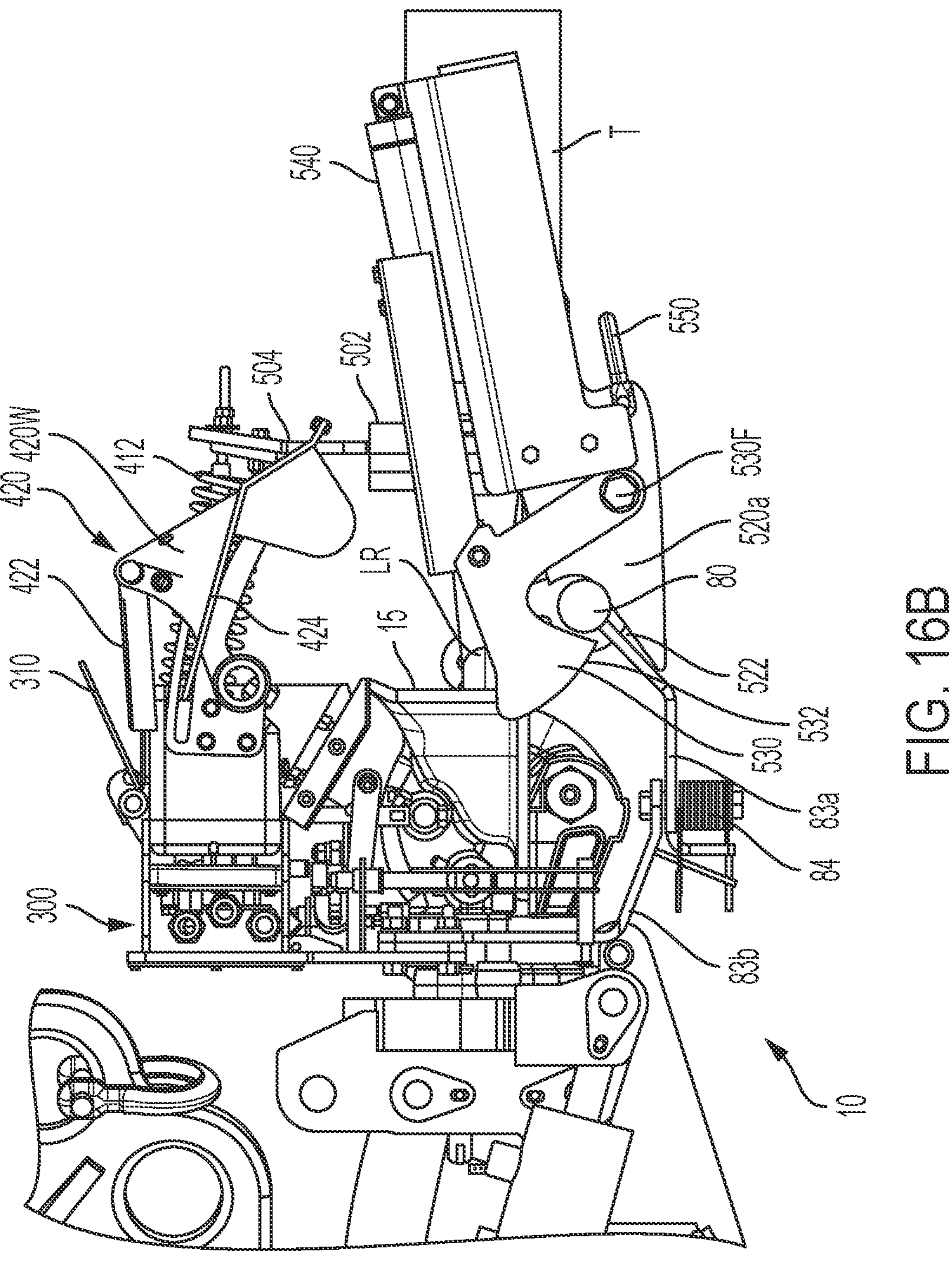
FIG. 16B illustrates the hitch apparatus of FIG. 16A coupled to the towed vehicle with the pintle hook connected to the lunette ring of the towed vehicle, the towing vehicle air/power manifold connected to the air/power manifold of the towed vehicle, and the secondary retention assembly of the towed vehicle attached to the latch bar of the hitch apparatus.

As illustrated in FIGS. 16A-16B, the towed vehicle air/power manifold 400 is positioned above the lunette ring LR of the towed vehicle by the Y-shaped member 504 of the secondary retention assembly 500 such that connection of the towed vehicle air/power manifold 400 to the towing vehicle air/power manifold 300 occurs substantially simultaneously with connection of the lunette ring LR to the pintle hook 12. FIG. 16B illustrates the two air/power manifolds 300, 400 connected together and the lunette ring LR connected to the pintle hook 12.

Figure 18A:
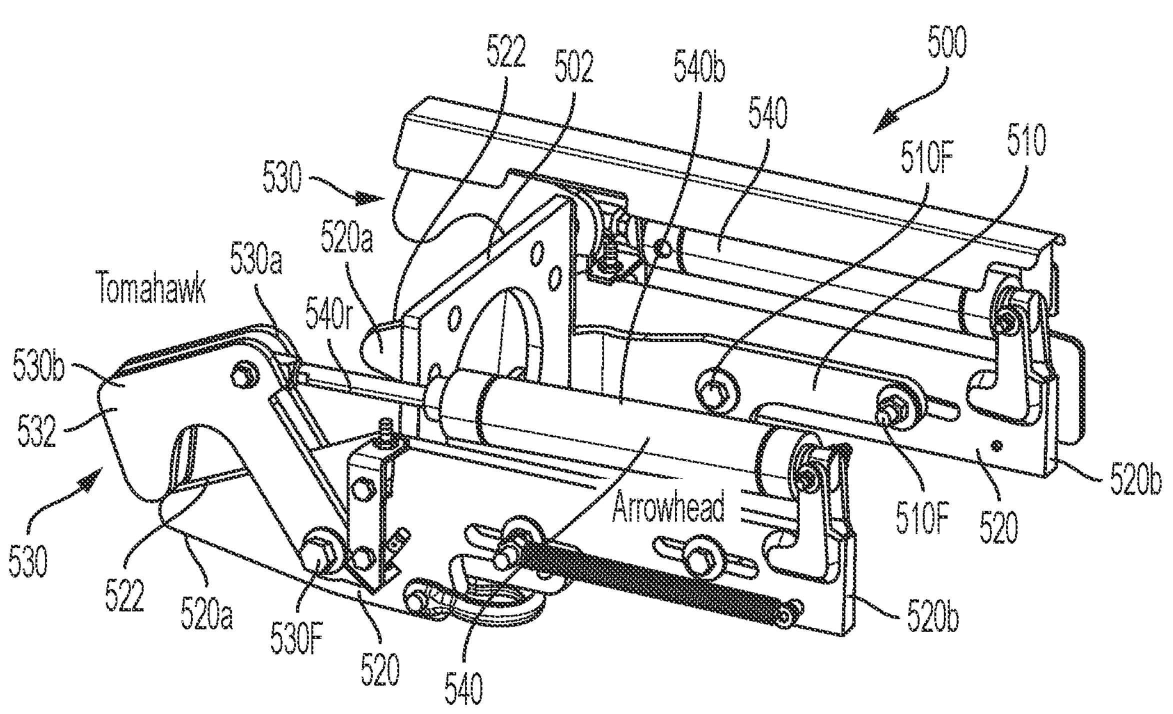
FIG. 18A is a perspective view of a secondary retention assembly, according to some embodiments of the present inventive concept.
Figure 18B:
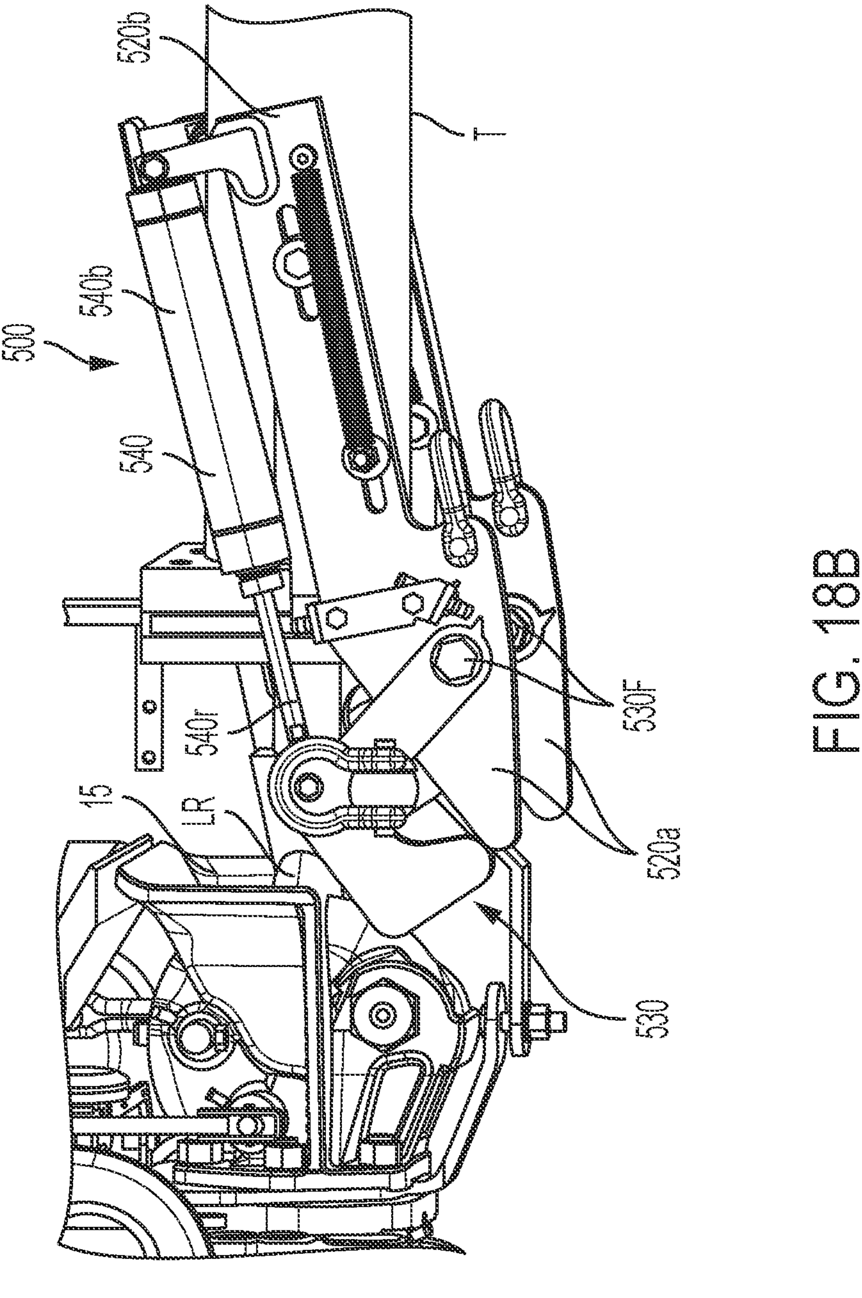
FIG. 18B illustrates the secondary retention assembly of FIG. 18A attached to a trailer tongue of a towed vehicle, and with the lunette ring of the trailer tongue connected to the pintle hook of the hitch apparatus and the secondary retention assembly attached to the latch bar of the hitch apparatus.

Referring to FIGS. 18A-18B, a secondary connection assembly 500 is illustrated. The secondary connection assembly 500 is configured to connect safety chains TC (FIG. 14B) attached to the towed vehicle to safety chains VC (FIG. 14B) attached to the towing vehicle to keep the towed vehicle attached to the towing vehicle in the event of a catastrophic failure of the pintle hitch 12 or lunette ring LR. In the illustrated embodiment, the hitch apparatus 10 includes a latch bar 80 (FIGS. 14A-14B) with a pair of brackets 82 attached at the opposite ends on latch bar 80. The brackets 82 each have a "T" shaped slot to capture the towing vehicle safety chains VC, as shown in FIG. 14B. The latch bar 80 is connected to the pintle frame 60 by a pair of arms 83*a*, 83*b*, as illustrated in FIG. 16A. The arms 83*a* and 83*b* are rotatably joined by a fastener to allow the latch bar 80 to swivel with the hitch apparatus 10 during the connection sequence and with the movement of the towed vehicle tongue T during travel. A spring 84 is operatively associated with the arms 83*a*, 83*b*. As such, the latch bar 80 is spring-biased to keep the latch bar 80 centered when the towing vehicle is not towing another vehicle. The arms 83*a*, 83*b* allow for rotation about a vertical or "Y" axis (FIG. 16A) to accommodate misalignment of the towed vehicle relative to the towing vehicle and to align the latch bar 80 with the gripping members 530 (described below). The spring 84 associated with the arms 83*a*, 83*b* attached to each bracket 82 urge the latch bar 80 to the centered configuration.

Upon failure of the pintle hook 12 or the lunette ring LR, the arms 83*a*, 83*b* and attachments are sacrificial and designed to break. The towed vehicle is then retained by the safety chains TC and VC. The towing vehicle includes two safety chains VC, one on each side of the hitch apparatus 10. Each towing vehicle safety chain VC is attached at one end to a chassis frame clevis 85 and at the opposite end to a slot 82*s* in the bracket 82, as illustrated in FIG. 14B. The towed vehicle also includes two safety chains TC, one on each side of the lunette ring LR. Each towed vehicle safety chain TC is attached at one end to a clevis 550 secured to a respective elongate member 520 of the secondary connection assembly 500 (described below) and at the opposite end to a portion of the towed vehicle or towed vehicle trailer tongue. The latch bar 80, brackets 82, and the secondary connection assembly 500 are designed to retain the towed vehicle via the connected safety chains VC, TC.

The illustrated secondary connection assembly 500 includes a frame 502 having a Y-shaped member 504 (FIG. 17B) with an upper portion 504*u* and two spaced apart lower portions 504L. An opening 506 between the two spaced apart lower portions 504L is configured to fit over and around a portion of the tongue T of the towed vehicle. The Y-shaped member 504 is bolted, welded, or otherwise secured to a bracket BR that is welded or otherwise secured to the towed vehicle tongue T. In the illustrated embodiment, fasteners 508 (FIG. 14A), such as bolts or rivets, extend through apertures 504*a* in the Y-shaped member 504 to secure the Y-shaped member 504 to the tongue bracket BR.

The Y-shaped member 504 further includes a leg portion 510 extending rearwardly from each lower portion 504*b*, as illustrated. Each leg portion 510 is configured to be attached to a respective elongate member 520 of the secondary connection assembly 500 via fasteners 510F (FIG. 18A). Each elongate member 520 has a first end portion 520*a* with an arrowhead shape and an opposite second end portion 520*b*. A gripping member 530 (also referred to as a "tomahawk" member) is pivotally secured to the first end portion 520*a* of each elongate member 520 and is movable between a non-gripping position and a gripping position. Each gripping member 530 is configured to engage the latch bar 80 when in the gripping position, as will be described below.

In the illustrated embodiment, each gripping member 530 includes a pair of spaced apart plates 530*a*, 530*b*, each positioned on a respective side of the first end portion 530*a* of the elongate member and pivotally secured to the first end portion 530*a* via a respective fastener 530F. However, embodiments of the present inventive concept are not limited to the illustrated configuration of the elongate members 520 or the gripping members 530. Each gripping member 530 is movable between a non-gripping position and a gripping position by an actuator 540. In the illustrated embodiment, the actuator 540 is a pneumatic linear actuator having a cylinder body 540*b* and cylinder rod 540*r*. The distal end of the cylinder rod 540*r* is connected to a gripping member 530 and the cylinder body 540*b* is connected to the second end portion 530*b* of an elongate member 520. The actuators 520 receive air from the air system of the towing vehicle once the towing vehicle air/power manifold 300 and the towed vehicle air/power manifold 400 are connected.

As the hitch apparatus 10 is moved toward the lunette ring LR, the latch bar 80 contacts the forward edge 532 of each gripping member plate 530*a*, 530*b* (FIG. 16A) which forces each gripping member 530 to rotate up about the pivot-point (i.e., fastener 530F) and close over the latch bar 80 (FIG. 16B) creating a connection of the safety chains VC, TC between the towing vehicle and the towed vehicle.

In some embodiments of the present inventive concept, an alignment system, such as that described in U.S. Pat. No. 8,798,842, and which is incorporated herein by reference in its entirety, may be utilized with hitch apparatus 10. For example, an alignment system may include at least one energy emitter secured to a vehicle that emits energy in the direction of a trailer tongue, and at least two sensors secured to the towing vehicle in spaced-apart relationship. Each sensor is configured to generate signals in response to detecting a reflection of the emitted energy from the trailer tongue. The energy emitter may be, for example, an optical emitter, an infrared emitter, an acoustic emitter, or an ultrasound emitter, and the sensors may be optical sensors, infrared sensors, acoustic sensors, or ultrasound sensors, respectively. In some embodiments, a separate energy emitter is not utilized. Instead, a pair of transducers (e.g., optical or acoustic transducers) are utilized, each of which emits energy in the direction of the trailer tongue and generates signals in response to detecting a reflection of the energy from the trailer tongue. In some embodiments of the present inventive concept, three or more transducers may be utilized. One or more processors are in communication with the sensors and process the signals generated by the sensors to provide directional data representative of a location of the trailer tongue relative to a target zone that represents a location of the hitch member 12.

In other embodiments of the present inventive concept, a positioning system may include one or more video cameras (e.g., 202*a*, 202*b*, FIG. 12) located at the rear of the towing vehicle for capturing video images, wherein the one or more video cameras have a field of view that at least encompasses the envelope (E, FIG. 10) in which the hitch member 12 can move.

A sequence for connecting the hitch apparatus 10 to a trailer or other towed vehicle will now be described. The towing vehicle is backed up to the trailer (or other towed vehicle) until the trailer hitch 10 is within the articulating hitch target zone (i.e., envelope E, FIG. 10). This can be established by an operator using a backup camera system (e.g., cameras 202*a*, 202*b*, FIG. 12, or some other alignment system) using visual cues provided by the displays 212, 212' in FIG. 12. Alternatively, this can be established by a person guiding the driver without having to place themselves in a hazardous position, or by an autonomous control system.

Side-view and rear-view cameras 202*a*, 202*b* (FIG. 12) can provide visual cues on a display 212, 212' utilized (either cab mounted or remote) to show position of the hitch apparatus relative to the lunette ring of the towed vehicle. An operator uses the user input device 200, 200' with assistance by CAN software of the towing vehicle that uses data from sensors to provide status reports and command options to the operator, to unlock the hitch by engaging the latch mechanism 16 to cause the actuator 17 to retract the locking pin 16*a* and release the hitch apparatus 10 from the frame F of the towing vehicle for operator control.

Figure 14A:
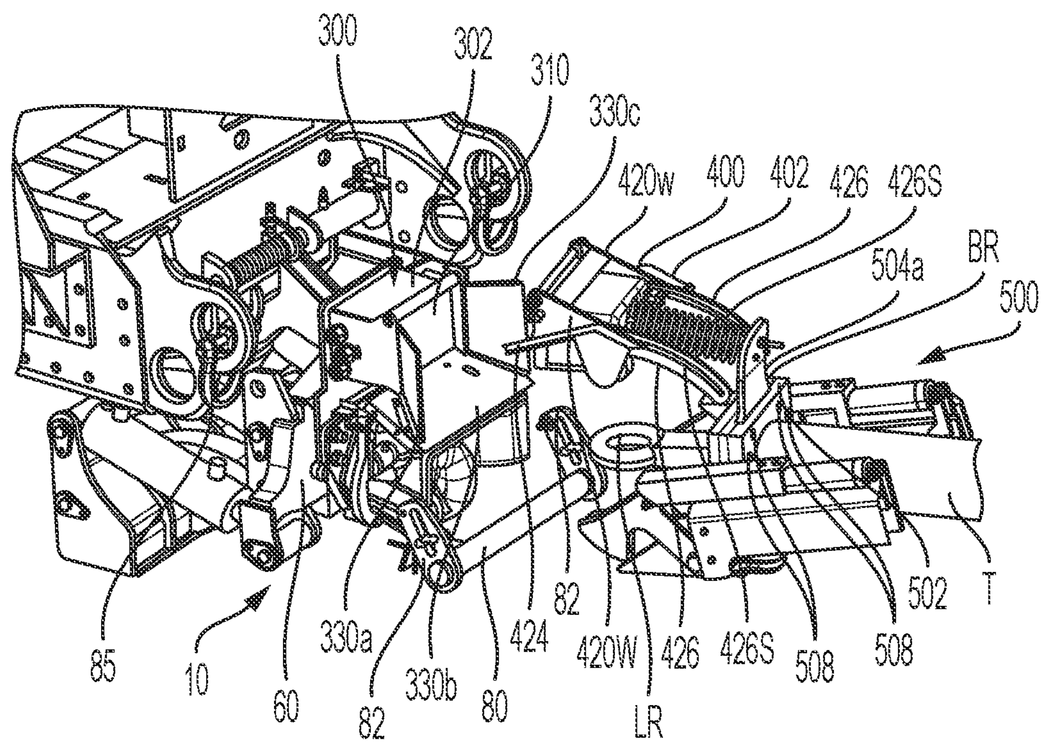
FIGS. 14A-14B are perspective views of a hitch apparatus being positioned to connect to a lunette ring and an air/power manifold of a towed vehicle, according to some embodiments of the present inventive concept.
Figure 14B:
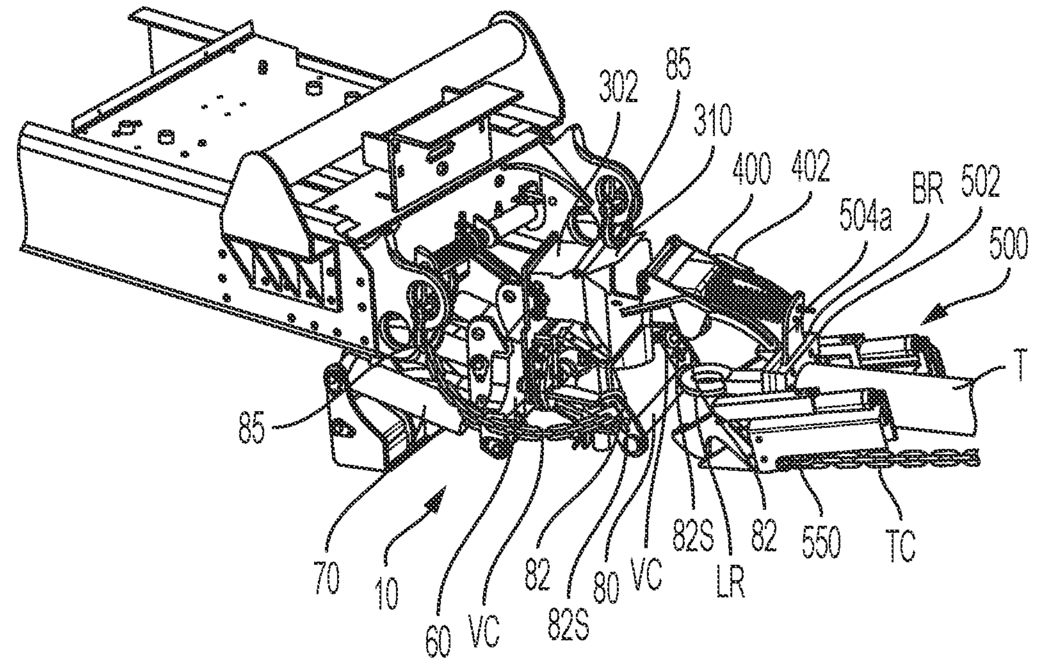

The operator uses the user input device 200, 200' (FIG. 12) to control the hitch apparatus 10 and to position the hitch apparatus 10 into position, as shown in FIGS. 14A-14B. Additional visual cues on the display 212, 212' prompts the operator to use the display control buttons 210, 210' (FIG. 12) to activate the pintle release mechanism 100 (FIG. 11) to unlock the pintle hook 12. The pintle release mechanism 100 uses cylinder 102 to extend and first engage pintle locking lever 104 pushing the lever 104 out and away from the pintle body to unlock the pintle hook 12. Once unlocked, the cylinder rod 102*r* pushes the pintle release lever 106 forward to open the coupler jaw 12*j* of the pintle hook 12, which drops open automatically once both levers are engaged and is held in the open position by a spring-loaded catch.

Concurrent with the pintle hook release operation, the control system 600 engages the cylinder 320 on the towing vehicle air/power manifold 300 (FIGS. 15A-15B) to open the air/power manifold cover 310 and expose the towing vehicle male pneumatic fittings 304 and the spring pin electrical connectors 306. Once the air/power manifold cover 310 is open, the control system 600 uses the compressed air system of the towing vehicle to force compressed air though the pneumatic fittings 304 and thereby blow any dust and debris away from the air/power manifold 300 and the pneumatic fittings 304 and electrical connectors 306.

With the pintle hitch 12 open, the towing vehicle air/power manifold cover 310 open, and the compressed air cleaning of the towing vehicle air/power manifold 300 complete, the control system 600 prompts the operator to use an input device 200, 200' to move the hitch apparatus 10 from the retracted position shown in FIG. 16A to the extended position shown in FIG. 16B to complete connection of the towed vehicle air/power manifold 400 to the towing vehicle air/power manifold 300 and connection of the lunette ring LR to the pintle hook 12.

As described above, the structure of the towing vehicle air/power manifold 300 cooperates with the structure of the towed vehicle air/power manifold 400 to assist in aligning the two air/power manifolds 300, 400 and completing the connection. For example, the side wings 424 of the protective apparatus 420 of the towed vehicle air/power manifold 400 contact the angled guide plates 330*a*, 330*c* of the towing vehicle air/power manifold housing 302 to guide the towed vehicle air/power manifold 400 into the towing vehicle air/power manifold 300. This contact causes the protective apparatus 420 to retract rearward on the brackets 426 as the hitch apparatus 10 continues to move toward the towed vehicle. The retraction of the protective apparatus 420 causes the spring-mounted air/power manifold cover 422 to open and retract with the protective apparatus 420, thereby allowing for mating of the towed vehicle air/power manifold 400 with the towing vehicle air/power manifold 300 and connection of the quick connect/disconnect pneumatic fittings 304, 404 and the spring pin electrical connectors 306, 406. The bell-mouth casing 15 surrounding the pintle hitch 12 facilitates the alignment and mating of the pintle hitch 12 with the lunette ring LR of the towed vehicle substantially simultaneously with the mating of the towed vehicle air/power manifold 400 with the towing vehicle air/power manifold 300.

The completion of the air and power connections charges the air system of the towed vehicle and enables the hitch control system 600 to release the parking brakes of the towed vehicle.

The secondary connection assembly 500 (FIGS. 16A-16B, 18A-18B) completes the connection of the safety chains to the towing vehicle to keep the towed vehicle attached to the towing vehicle in the event of a catastrophic failure of the pintle hook 12 or the lunette ring LR.

Once the conditions are met to complete the connect sequence, the control system 600 signals the operator that: the pintle release mechanism 100 is locked; the towing vehicle air/power manifold 300 and the towed vehicle air/power manifold 400 are connected with positive connections for air and power between the towing vehicle and towed vehicle; and the secondary connection assembly 500 is closed with positive capture of the latch bar 80. The control system 600 then signals the operator to input a stow command on a display 212, 212' to raise, center and retract the hitch apparatus 10 to the stowed position and activate the latching mechanism 16 to lock the hitch apparatus for transport.

A sequence for disconnecting the hitch apparatus 10 from a trailer or other towed vehicle will now be described. The towing vehicle moves the towed vehicle into position for disconnection. An operator uses the user input device control buttons 210, 210' (FIG. 12) to unlock the hitch apparatus 10 by engaging the latch mechanism 16 to cause the actuator 17 to retract the lock pin 16*a* and release the hitch apparatus 10 for operator control. The operator uses the user input device control buttons 210, 210' to extend the hitch apparatus 10 and lower the trailer tongue T to remove the weight from the pintle hook 12.

The operator then uses the user input device control buttons 210, 210' to initiate the disconnect sequence and engage the pintle release mechanism 100 as described above to open the pintle coupler jaw 12*j* and signal the secondary retention assembly 500 to retract cylinder rods 540*r* and rotate the gripping members 530 up and rearward to release the latch bar 80. With the pintle release and secondary retention mechanisms 100, 500 in the open position, the control system 600 signals the operator to input the stow command via the user input devices 200, 200' to retract the hitch apparatus 10 and disconnect the towing vehicle air/power manifold 300 from the towed vehicle air/power manifold 400, thereby disconnecting the air lines and causing the towed vehicle parking brakes to engage, then raise and center the hitch apparatus 10 to the home position, and then activate the latching mechanism 16 to lock the hitch apparatus for transport.

In some embodiments of the present inventive concept, the hitch apparatus 10 may be utilized with an autonomous hitch system that is configured to locate and identify a trailer or other towed vehicle for attachment, control the towing vehicle to move into position relative to an identified trailer or other towed vehicle, and autonomously couple the hitch apparatus 10 on the vehicle with the identified trailer. The towing vehicle includes a steering system, a powertrain system, and a brake system, and the control system is configured to control the steering system, the powertrain system, and the brake system to position the towing vehicle adjacent to the towed vehicle, and control the hitch apparatus 10 to articulate into position to capture the trailer, capture the trailer, and then make mechanical, air, power, safety connections, as described above. The hitch apparatus 10 returns to its home position, the latching mechanism 16 engages with the vehicle chassis F, the trailer brakes are disengaged, and the trailer jack stand is moved to a tow position. The autonomous hitch system may be configured to review data transferred to/from the towing vehicle and the trailer to confirm that proper connection has been made.

The autonomous hitch system is configured to autonomously decouple the vehicle from the trailer upon reaching a destination. The towing vehicle positions the trailer in a proper location/attitude for decoupling and causes the trailer jack stand to move to a parked position. The hitch apparatus 10 and trailer are decoupled, the trailer brakes are engaged, and the hitch returns to the home position.

The autonomous hitch system eliminates the need for an operator to make the towing vehicle/towed vehicle connection and disconnection. As such user input devices are required. It also eliminates the need for the two cameras 202*a* and 202*b* in FIG. 12, and substitutes the 3D camera 220 that provides 3 dimensional coordinates on what is currently being viewed in either camera location in FIG. 13B. The autonomy perception module 708 (FIG. 19) delivers 3D spatial video data that the travel path planner module 710 converts into actionable commands that the operating system 706 sends to the hydraulic/pneumatic controller 214 (FIG. 12) to execute the operational sequence to complete the towing vehicle/towed vehicle connection and disconnection to replace (minimize) the amount of interaction required from the operator.

Such an autonomous hitch system can provide reliable operation across various load and terrain profiles. In addition, the autonomous hitch system provides for an emergency disconnect between a vehicle and trailer.

Figure 19:
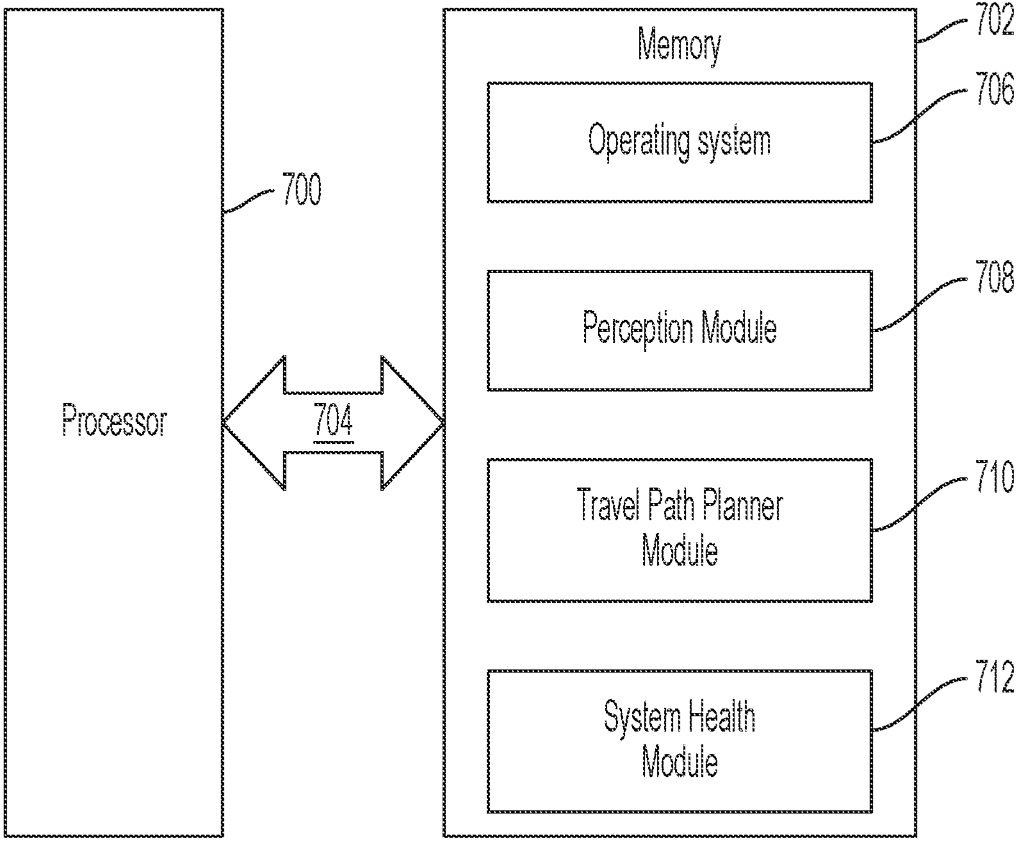
FIG. 19 is a block diagram that illustrates a software architecture for controlling operations of a hitch apparatus and system, according to some embodiments of the present inventive concept.

FIG. 19 illustrates a processor 700 and a memory 702 that may be integrated with the control system 600 of FIG. 12 to complete the towed vehicle connection and disconnection operations described above autonomously, according to some embodiments of the present inventive concept. For example, in some embodiments, the processor 700 and memory 702 may be used to embody the processors and the memories used by the control system 600 to connect (e.g., under operator control, semi-autonomous control, or autonomous control) the hitch apparatus 10 to a towed vehicle. The processor 700, memory 702, and data storage may be internally located within a towing vehicle or may be externally located, for example, in another device that communicates with the towing vehicle and hitch apparatus 10.

The processor 700 communicates with the memory 702 via an address/data bus 704. The processor 700 may be, for example, a commercially available or custom microprocessor. The memory 702 is representative of the overall hierarchy of memory devices containing the software and data used in controlling operations (semi-autonomous and/or autonomous operations) to connect the hitch apparatus 10 to a towed vehicle. The memory 702 may include, but is not limited to, the following types of devices: cache, ROM, PROM, EPROM, EEPROM, flash, SRAM, and DRAM.

As shown in FIG. 19, the memory 702 may hold the following major categories of software and data: an operating system 706, a perception module 708, a travel path planner module 710, and a system health module 712. The operating system 706 controls operations of the control system 600. In particular, the operating system 706 may manage the device resources of the control system and coordinates execution of the various programs (e.g., the perception module 708, the hitch apparatus travel path planner module 710, and the system health module 712) by the processor 700.

The perception module 708 comprises logic for communicating with and controlling a three-dimensional (3D) camera 220 (FIG. 13B) of the control system 600. In addition, the perception module 708 comprises computer vision software configured to utilize data from the 3D camera 220 to locate a towed vehicle and calculate a position of the towed vehicle relative to the hitch apparatus 10.

The travel path planner module 710 comprises logic for obtaining information from the perception module 708 regarding the position of the towed vehicle relative to the hitch apparatus 10, and then generating a non-colliding trajectory path for moving the hitch apparatus 10 to connect to the towed vehicle.

The system health module 712 comprises logic for communicating with a controller area network (CAN) bus control system 600 for determining if there are any issues with any of the hitch systems during connection of the hitch apparatus 10 to the towed vehicle.

Although FIG. 19 illustrates an exemplary software architecture that may be used with the control system 600 of FIG. 12, it will be understood that the present invention is not limited to such a configuration, but is intended to encompass any configuration capable of carrying out the operations described herein.

Computer program code for carrying out operations of the perception module 708, the hitch apparatus travel path planner module 710, and the system health module 712 may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

The foregoing is illustrative of the present inventive concept and is not to be construed as limiting thereof. Although a few example embodiments of the inventive concept have been described, those skilled in the art will readily appreciate that many modifications are possible in the exemplary embodiments without materially departing from the teachings and advantages of the inventive concept. Accordingly, all such modifications are intended to be included within the scope of the inventive concept as defined in the claims. The present inventive concept is defined by the following claims, with equivalents of the claims to be included therein.

That which is claimed is:

1. A hitch apparatus for connecting a towed vehicle to a towing vehicle, the hitch apparatus comprising:

a frame movably secured to the towing vehicle;

a hitch member secured to the frame, the hitch member configured to receive a coupling apparatus of the towed vehicle; and a manifold configured to operably connect an electrical system and a pneumatic system of the towing vehicle to the towed vehicle, wherein the manifold comprises a first electrical connector connected to the electrical system of the towing vehicle and a first pneumatic connector connected to the pneumatic system of the towing vehicle, wherein the manifold is configured to matingly engage a corresponding towed vehicle manifold, wherein the towed vehicle manifold comprises a second electrical connector connected to an electrical system of the towed vehicle and a second pneumatic connector connected to a pneumatic system of the towed vehicle, and wherein engagement of the towing vehicle manifold and the towed vehicle manifold causes the first electrical connector to couple with the second electrical connector and the first pneumatic connector to couple with the second pneumatic connector;

wherein the frame is movable relative to the towing vehicle such that the hitch member can be positioned rearward of the towing vehicle at any location within a defined three-dimensional space, and wherein the frame is configured to maintain the hitch member in a substantially level orientation at all locations within the three-dimensional space.

2. The hitch apparatus of claim 1, wherein the frame is configured to rotate about a first axis, rotate about a second axis transverse to the first axis, and move between retracted and extended positions.

3. The hitch apparatus of claim 2, further comprising:

a first actuator configured to rotate the frame about the first axis;

a second actuator configured to rotate the frame about the second axis; and a third actuator configured to move the frame between the retracted and extended positions.

4. The hitch apparatus of claim 3, wherein the first, second and third actuators are hydraulic actuators, electrical actuators, or pneumatic actuators.

5. The hitch apparatus of claim 1, further comprising a latching mechanism configured to releasably secure the frame to the towing vehicle when the hitch apparatus is in a towing position.

6. The hitch apparatus of claim 2, wherein the first axis is a substantially vertical axis and wherein the second axis is a substantially horizontal axis.

7. The hitch apparatus of claim 1, wherein the hitch member is a ball coupler, a pintle hook, a cushioned pintle hook, a swivel pintle hook, a lunette ring, or a clevis pin attachment.

8. The hitch apparatus of claim 1, wherein the hitch member is a pintle hook that is movable between closed and open positions, and wherein the hitch apparatus further comprises a release mechanism configured to cause the pintle hook to move to the open position.

9. A hitch system for connecting a towed vehicle to a towing vehicle, the hitch system comprising:

a hitch apparatus comprising:

a frame movably secured to the towing vehicle; and a hitch member secured to the frame, the hitch member configured to receive a coupling apparatus of the towed vehicle;

a latch bar connected to the frame by sacrificial arms that are configured to break upon failure of the hitch member;

a pair of safety chains, each safety chain comprising a first end attached to the latch bar and an opposite second end attached to the towing vehicle;

wherein the latch bar is configured to be engaged by safety chains associated with the towed vehicle;

wherein the frame is movable relative to the towing vehicle such that the hitch member can be positioned rearward of the towing vehicle at any location within a defined three-dimensional space, and wherein the frame is configured to maintain the hitch member in a substantially level orientation at all locations within the three-dimensional space; and a control system operably associated with the hitch apparatus and configured to move the hitch member to a desired location within the three-dimensional space.

10. The hitch system of claim 9, wherein the control system is a semi-autonomous and/or autonomous control system.

11. The hitch system of claim 9, wherein the towing vehicle comprises a steering system, a powertrain system, and a brake system, and wherein the control system is further configured to:

control the steering system, the powertrain system, and the brake system to position the towing vehicle adjacent to the towed vehicle;

control the hitch apparatus to engage the hitch member with the coupling apparatus of the towed vehicle; and control the hitch apparatus to disengage the hitch member from the coupling apparatus of the towed vehicle.

12. The hitch system of claim 11, wherein the control system is a semi-autonomous and/or autonomous control system.

13. The hitch system of claim 11, further comprising an imaging system, and wherein the control system is configured to utilize image data from the imaging system to position the towing vehicle adjacent the towed vehicle and to engage the hitch member with the coupling apparatus of the towed vehicle.

14. The hitch system of claim 13, wherein the imaging system comprises a plurality of cameras.

15. The hitch system of claim 13, wherein the imaging system comprises a three-dimensional (3D) camera.

16. The hitch system of claim 13, further comprising a user interface configured to display image data from the imaging system.

17. The hitch system of claim 9, wherein the frame is configured to rotate about a first axis, rotate about a second axis transverse to the first axis, and move between retracted and extended positions.

18. The hitch system of claim 17, further comprising:

a first actuator configured to rotate the frame about the first axis;

a second actuator configured to rotate the frame about the second axis; and a third actuator configured to move the frame between the retracted and extended positions.

19. The hitch system of claim 18, wherein the first, second and third actuators are hydraulic actuators, electrical actuators, or pneumatic actuators.

20. The hitch system of claim 9, further comprising a latching mechanism configured to releasably secure the frame to the towing vehicle when the hitch apparatus is in a towing position.

21. The hitch system of claim 17, wherein the first axis is a substantially vertical axis and wherein the second axis is a substantially horizontal axis.

22. The hitch system of claim 9, wherein the hitch member is a ball coupler, a pintle hook, a cushioned pintle hook, a swivel pintle hook, a lunette ring, or a clevis pin attachment.

23. The hitch system of claim 9, wherein the hitch member is a pintle hook that is movable between closed and open positions, and wherein the hitch apparatus further comprises a release mechanism configured to cause the pintle hook to move to the open position.

24. The hitch system of claim 9, further comprising a manifold configured to operably connect an electrical system and a pneumatic system of the towing vehicle to the towed vehicle, wherein the manifold comprises a first electrical connector connected to the electrical system of the towing vehicle and a first pneumatic connector connected to the pneumatic system of the towing vehicle, wherein the manifold is configured to matingly engage a corresponding towed vehicle manifold, wherein the towed vehicle manifold comprises a second electrical connector connected to an electrical system of the towed vehicle and a second pneumatic connector connected to a pneumatic system of the towed vehicle, and wherein engagement of the towing vehicle manifold and the towed vehicle manifold causes the first electrical connector to couple with the second electrical connector and the first pneumatic connector to couple with the second pneumatic connector.

25. The hitch system of claim 24, wherein the control system is further configured to control engagement and disengagement of the towing vehicle manifold and towed vehicle manifold.

26. The hitch system of claim 9, further comprising a secondary retention apparatus configured to automatically connect the safety chains of the towed vehicle to the latch bar and automatically disconnect the safety chains of the towed vehicle from the latch bar.

27. The hitch system of claim 26, wherein the control system is further configured to control operation of the secondary retention apparatus to connect the safety chains of the towed vehicle to the latch bar and to disconnect the safety chains of the towed vehicle from the latch bar.

28. The hitch system of claim 24, wherein the towing vehicle manifold comprises a housing having at least one angled guide wall, and wherein the towed vehicle manifold comprises a housing having at least one side wing configured to engage the at least one guide wall prior to engagement of the towing vehicle manifold and the towed vehicle manifold.

29. A hitch system for connecting a towed vehicle to a towing vehicle, wherein the towing vehicle comprises a steering system, a powertrain system, and a brake system, the hitch system comprising:

a hitch apparatus comprising:

a frame movably secured to the towing vehicle; and a hitch member secured to the frame, the hitch member configured to receive a coupling apparatus of the towed vehicle;

wherein the frame is movable relative to the towing vehicle such that the hitch member can be positioned rearward of the towing vehicle at any location within a defined three-dimensional space, and wherein the frame is configured to maintain the hitch member in a substantially level orientation at all locations within the three-dimensional space; and a control system operably associated with the hitch apparatus, the control system configured to:

move the hitch member to a desired location within the three-dimensional space;

control the steering system, the powertrain system, and the brake system to position the towing vehicle adjacent to the towed vehicle;

control the hitch apparatus to engage the hitch member with the coupling apparatus of the towed vehicle; and control the hitch apparatus to disengage the hitch member from the coupling apparatus of the towed vehicle.

30. A hitch system for connecting a towed vehicle to a towing vehicle, the hitch system comprising:

a hitch apparatus comprising:

a frame movably secured to the towing vehicle;

a hitch member secured to the frame, the hitch member configured to receive a coupling apparatus of the towed vehicle; and a manifold configured to operably connect an electrical system and a pneumatic system of the towing vehicle to the towed vehicle, wherein the manifold comprises a first electrical connector connected to the electrical system of the towing vehicle and a first pneumatic connector connected to the pneumatic system of the towing vehicle, wherein the manifold is configured to matingly engage a corresponding towed vehicle manifold, wherein the towed vehicle manifold comprises a second electrical connector connected to an electrical system of the towed vehicle and a second pneumatic connector connected to a pneumatic system of the towed vehicle, and wherein engagement of the towing vehicle manifold and the towed vehicle manifold causes the first electrical connector to couple with the second electrical connector and the first pneumatic connector to couple with the second pneumatic connector;

wherein the frame is movable relative to the towing vehicle such that the hitch member can be positioned rearward of the towing vehicle at any location within a defined three-dimensional space, and wherein the frame is configured to maintain the hitch member in a substantially level orientation at all locations within the three-dimensional space; and a control system operably associated with the hitch apparatus and configured to move the hitch member to a desired location within the three-dimensional space.

* * * * *